(12) United States Patent
Demyanov et al.

(10) Patent No.: US 12,148,202 B2
(45) Date of Patent: Nov. 19, 2024

(54) DOMAIN CHANGES IN GENERATIVE ADVERSARIAL NETWORKS

(71) Applicant: Snap Inc., Santa Monica, CA (US)

(72) Inventors: Sergey Demyanov, Santa Monica, CA (US); Konstantin Gudkov, London (GB); Fedor Zhdanov, London (GB); Andrei Zharkov, London (GB)

(73) Assignee: Snap Inc., Santa Monica, CA (US)

( * ) Notice: Subject to any disclaimer, the term of this patent is extended or adjusted under 35 U.S.C. 154(b) by 236 days.

(21) Appl. No.: 17/841,333

(22) Filed: Jun. 15, 2022

(65) Prior Publication Data

US 2023/0410479 A1    Dec. 21, 2023

(51) Int. Cl.
| | |
|---|---|
| *G06T 11/00* | (2006.01) |
| *G06T 3/18* | (2024.01) |
| *G06T 7/68* | (2017.01) |
| *G06V 10/74* | (2022.01) |
| *G06V 10/774* | (2022.01) |
| *G06V 10/82* | (2022.01) |
| *G06V 40/16* | (2022.01) |

(52) U.S. Cl.
CPC .............. *G06V 10/774* (2022.01); *G06T 3/18* (2024.01); *G06T 7/68* (2017.01); *G06T 11/00* (2013.01); *G06V 10/74* (2022.01); *G06V 10/82* (2022.01); *G06V 40/16* (2022.01); *G06T 2207/20081* (2013.01); *G06T 2207/20084* (2013.01); *G06T 2207/20221* (2013.01); *G06T 2207/30201* (2013.01)

(58) Field of Classification Search
None
See application file for complete search history.

(56) References Cited

U.S. PATENT DOCUMENTS

2023/0214663 A1* 7/2023 Kumar .................. G06N 3/088
382/155

* cited by examiner

*Primary Examiner* — Robert J Craddock
(74) *Attorney, Agent, or Firm* — Schwegman Lundberg & Woessner, P.A.

(57) ABSTRACT

An image manipulation system for generating modified images using a generative adversarial network (GAN) trains GANs using domain changes, aligns input images with generated images, classifies and associates target images based on a symmetry, and uses a modified discriminator structure. A method for domain changes includes generating, using a pre-trained GAN trained on a plurality of first target images, a plurality of images, and determining a feature for each of the plurality of images. The method further includes determining the feature for each of a plurality of second target images and matching, based on the feature, second target images of the plurality of second target images with the plurality of images. The method further includes training a discriminator of the pre-trained GAN with the second target images and the plurality of images.

20 Claims, 22 Drawing Sheets

US 12,148,202 B2

DOMAIN CHANGES IN GENERATIVE ADVERSARIAL NETWORKS

TECHNICAL FIELD

Examples of the present disclosure relate generally to generative adversarial networks (GANs). More particularly, but not by way of limitation, examples of the present disclosure relate to training GANs for image generation with matching datasets and with datasets with conditions. Additionally, examples of the present disclosure relate to adjusting images generated by the GANs with warp fields, alpha blending, and poison blending, and including additional structures including neural networks in the generator and the discriminator.

BACKGROUND

A Generative Adversarial Networks (GAN) is a machine learning framework in which two neural networks: a discriminator network and a generator network, contest with each other in a zero-sum game. Given a training data set, a GAN trained model learns to generate new data with the same statistics as the training set.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
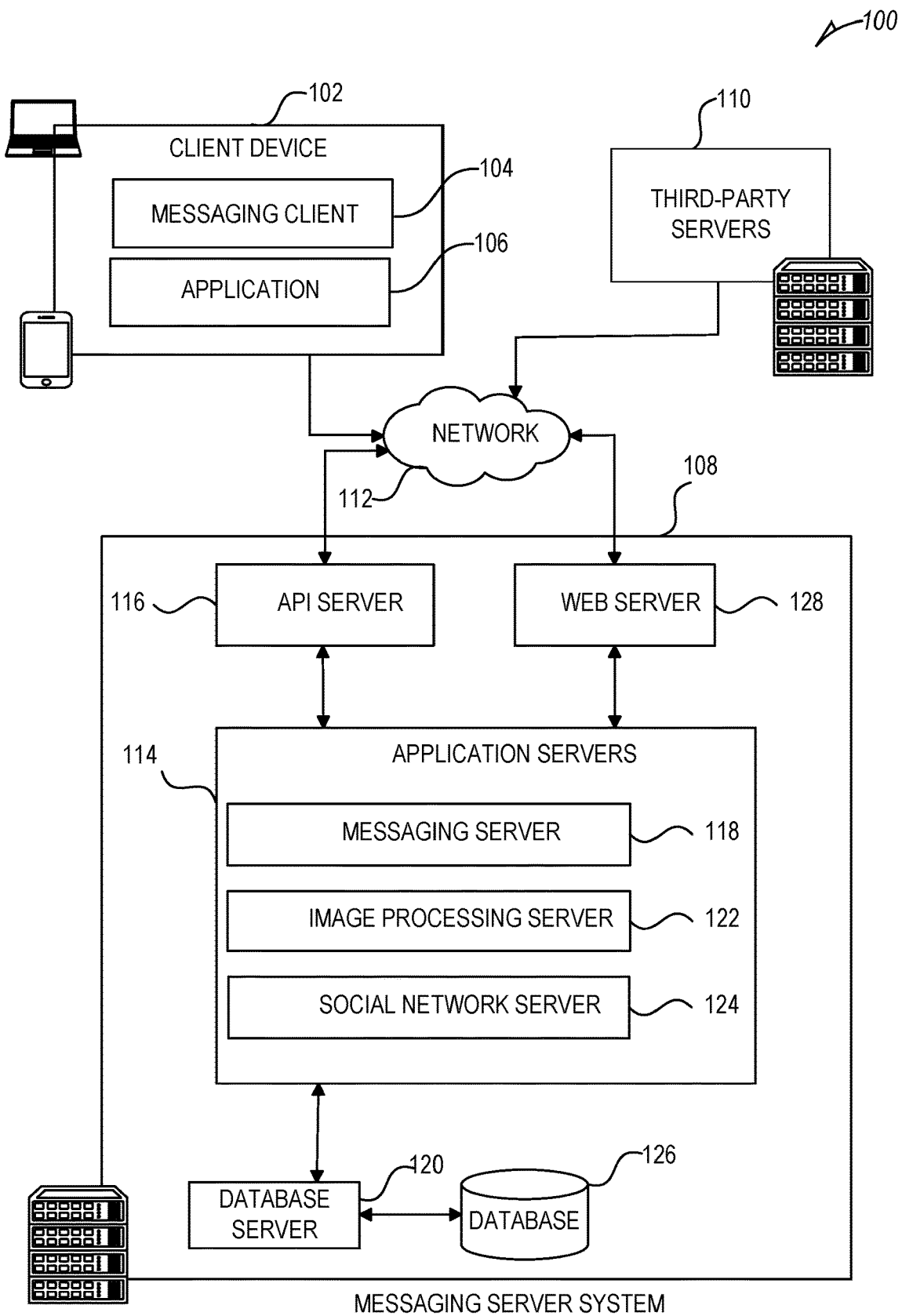
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Embodiments herein describe methods and systems for generating images using GANs. A GAN image generation system may include a pre-trained GAN, which receives a value derived from a latent space as an input and produces high-quality artificial images of human faces as an output. The pre-trained GAN is made up of two neural networks: a generator and a discriminator. The discriminator learns to differentiate between the output of the generator, termed fake images, and target images, termed real images, which may be images such as real human faces. The discriminator is trained with backpropagation. The generator learns to generate images that fool or get the discriminator into determining that an image generated by the generator is a real image and not a fake image. In this way, the generator learns how to generate images similar to the target images or real images. The target images or real images are termed a primary domain.

The GAN image generation system is trained on one or more secondary domains where the target images are, for example, cartoon images. The secondary domains are associated with conditions that are used as input to the generator and, in some examples, the discriminator. For training with the secondary domains, some of the layers of the generator and discriminator are frozen, which means that their weights are not adjusted during the backpropagation process.

A first example technical problem is how to get the discriminator to focus on only domain related properties where the domain is the primary domain or the secondary domain. Some examples address this technical problem by determining features of fake images, which are those generated by the generator, and real images, which are those that are provided. The features include face rotation, gender, head tilt, a head position, a facial expression, a type of dress, and so forth. The training of the discriminator is batched with real images and fake images. Real images are selected that have the same features as the fake images. This pairing up of the real images with the fake images improves the training of the discriminator and thus the generator to focus on domain related properties separate from the features.

A second example technical problem is to have a smooth interpolation around a face area of the resultant image from a domain transfer. A domain transfer is where an image is taken as an input to the GAN image generation system, which has been trained on at least two domains. An inverse mapping of the input image is then determined for the generator. This inverse mapping is a number derived from the latent space that is used as an input to start the generator. The latent space number may be termed a latent space value. The inverse mapping is then used with conditions to generate the domain transfer image. As an example, the input image is a real face, and the domain transfer image is a cartoon representation of the real face. Some examples address the technical problem of a warp field between an input image such as a face and the domain transfer image or stylized image by a face landmarks correspondence method. Then the warp field is projected through the feature map, which is an input to a layer within the generator that is configured for the domain transfer image. Additionally, alpha blending is used to blend the stylized face region feature map to the background feature maps from the input image. Moreover, poison blending is used for skin tone between the input image feature space and the stylized face.

A third example technical problem relates to the training of the GAN image generation system with target images that are asymmetric so that asymmetric images are not generated by the generator. This third technical problem is addressed by associating a condition value to asymmetrical images and to symmetrical images. The condition value for the symmetrical images is then used for the generation of images by the generator after training.

A fourth example technical problem relates to improvement of the conditioning portion of the discriminator that determines whether an image is fake or real. Some examples address the fourth technical problem by using the following structure. A neural network such as a residual neural network outside the discriminator's final layer. The neural network has input conditions and parameters. A dot product is taken of the output of the neural network and the output of the final layer of the discriminator. The dot product is used to determine whether the image is fake or real. The structure that seeks to address the fourth technical problem improves the conditioning portion of the discriminator and does not require changing how the discriminator is trained.
Networked Computing Environment FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
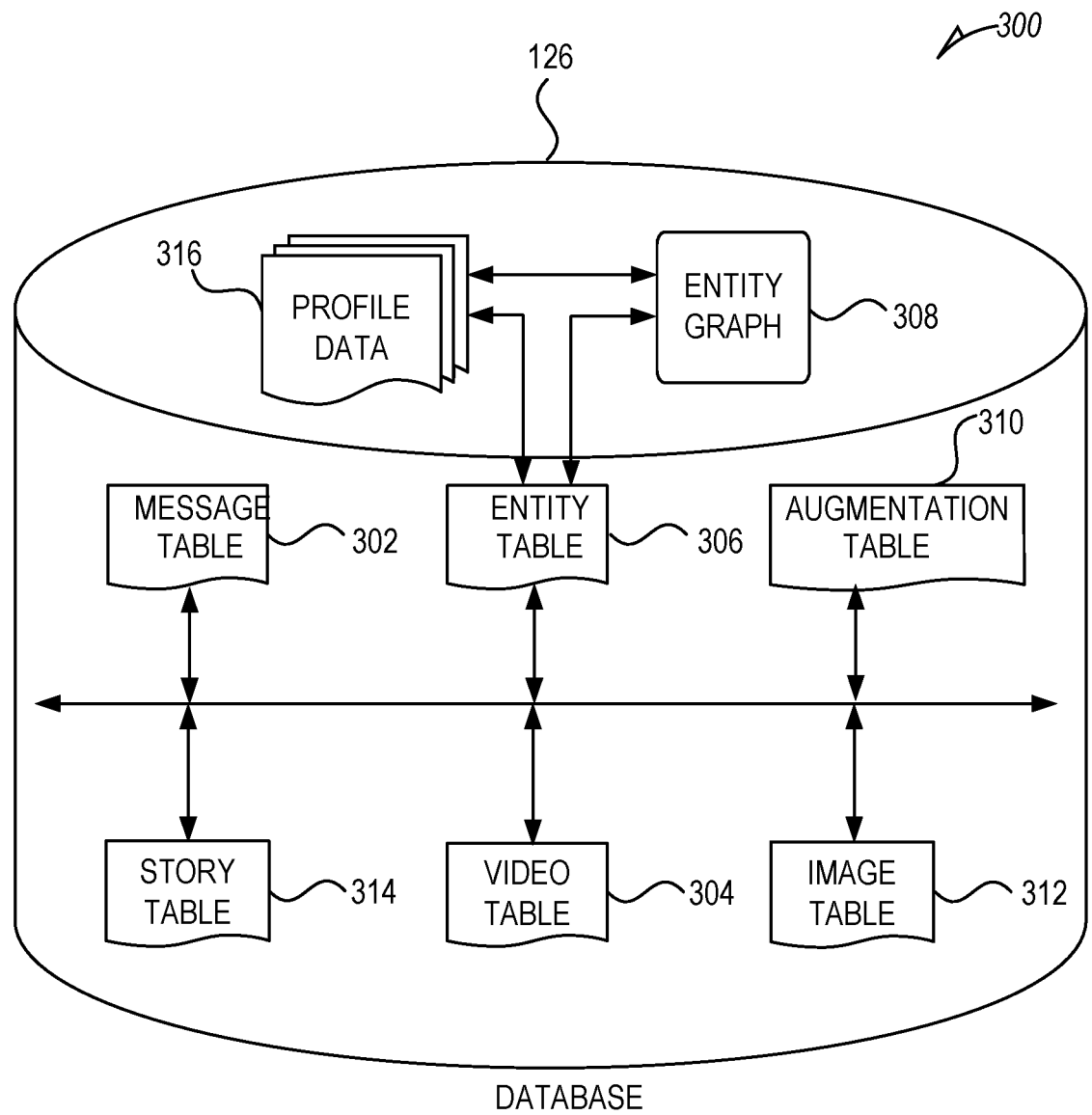
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
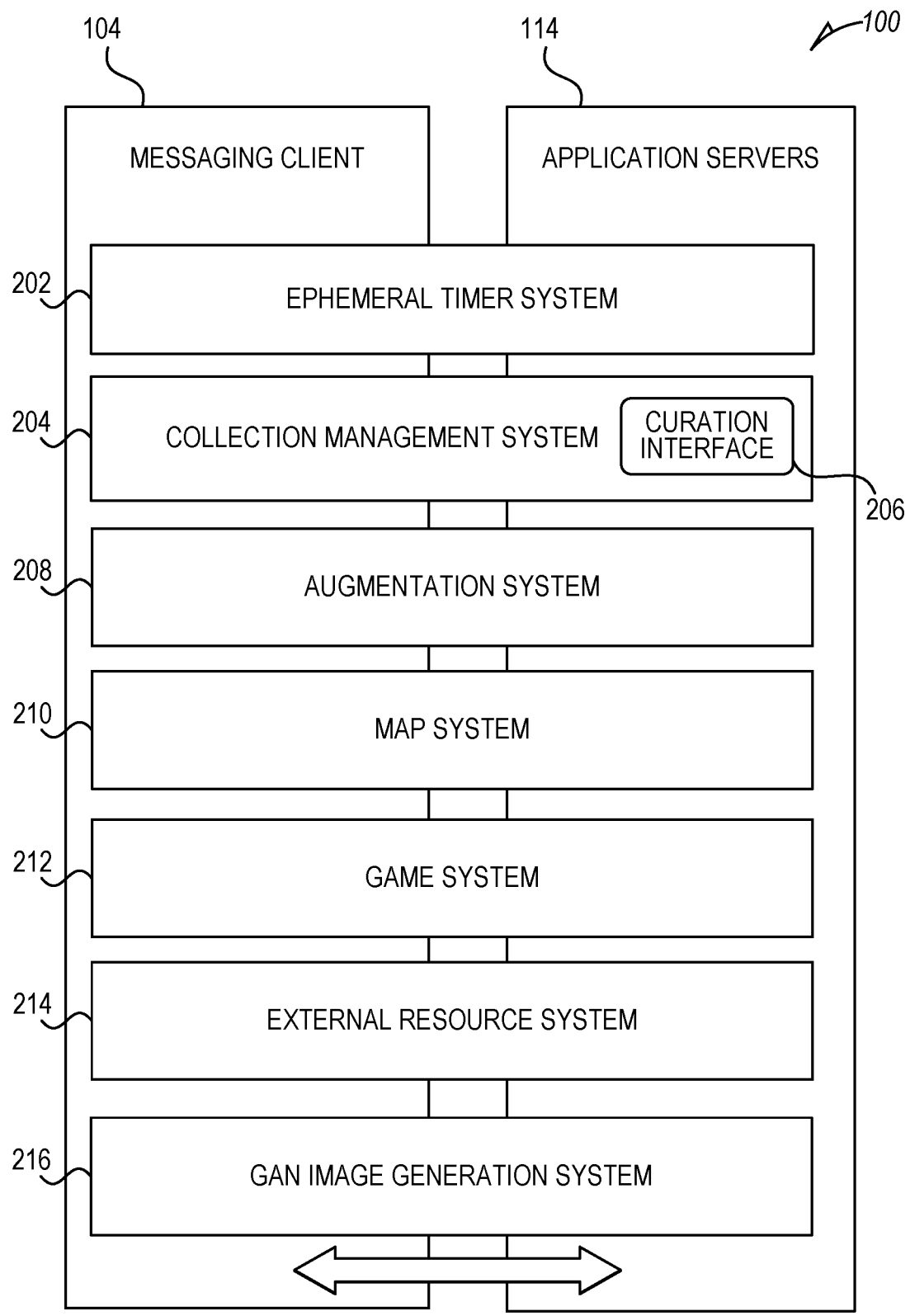
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and a GAN image generation system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object,) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The GAN image generation system 216 provides functions and routines for performing a GAN image generation. The GAN image generation system 216 provides the functions and routines as described herein and in FIGS. 6-19. The GAN image generation system 216 is configured to train the G NN 602 and the G NN 1700. The GAN image generation system 216 provides the function for the user interface illustrated on the screen of device 1226. The GAN image generation system 216 operates in conjunction with a client device 102 where the functionality is split between the GAN image generation system 216 and the client device 102.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular message, at least message sender data, message recipient (or receiver) data, and a payload. Further details regarding information that may be included in a message and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element.

Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such methods, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with the use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcasted by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
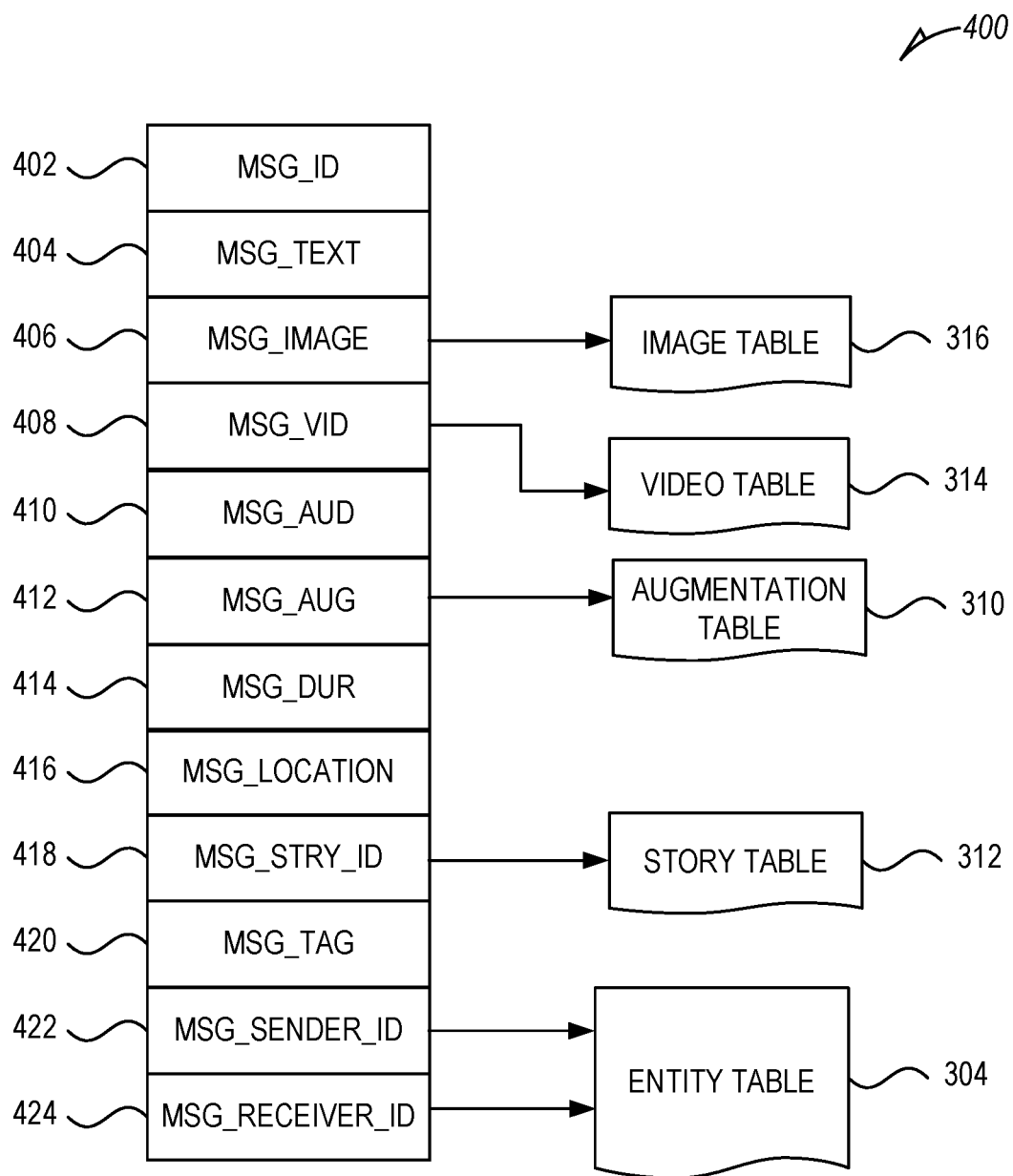
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
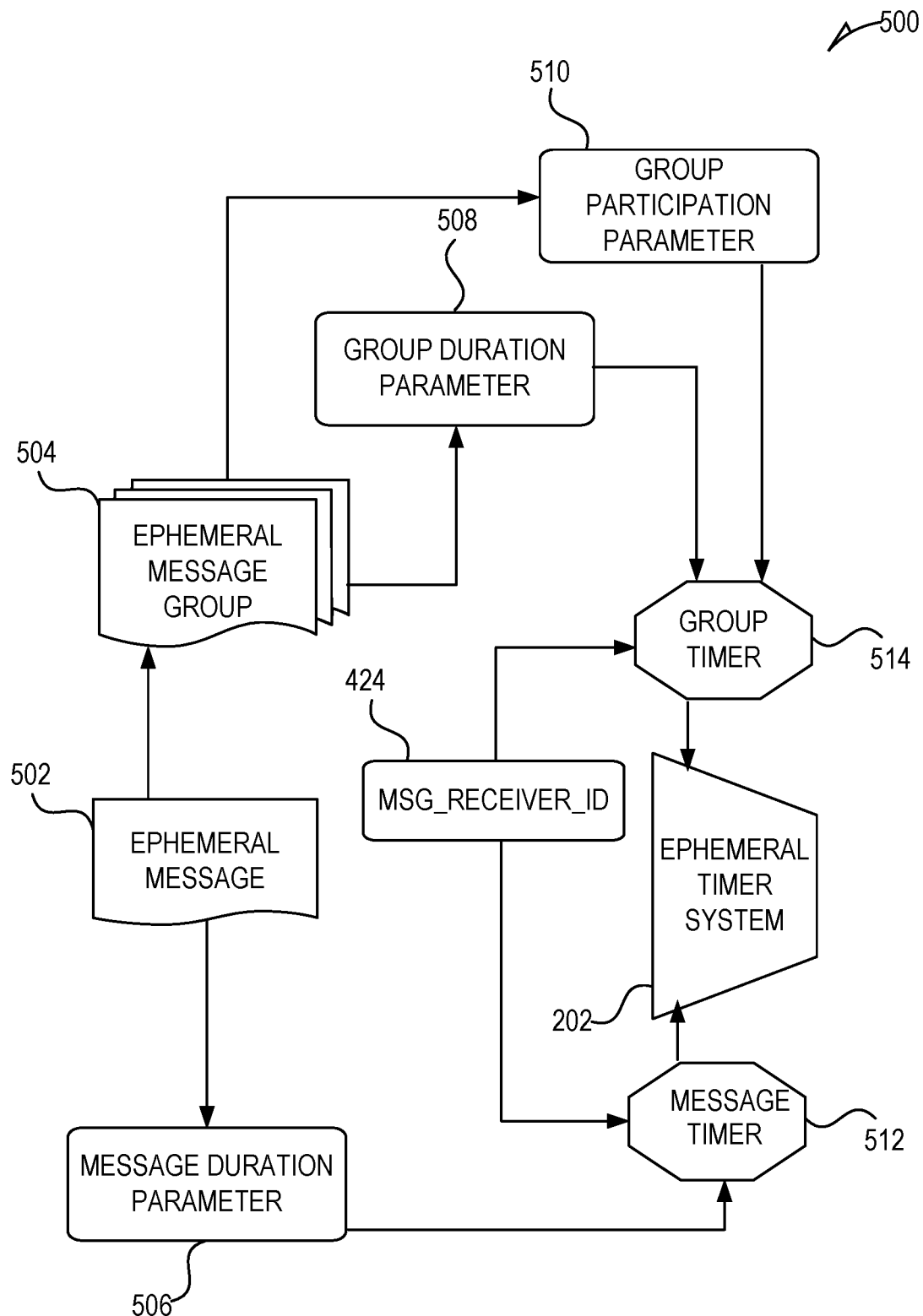
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Domain Changes in Generative Adversarial Networks

Figure 6:
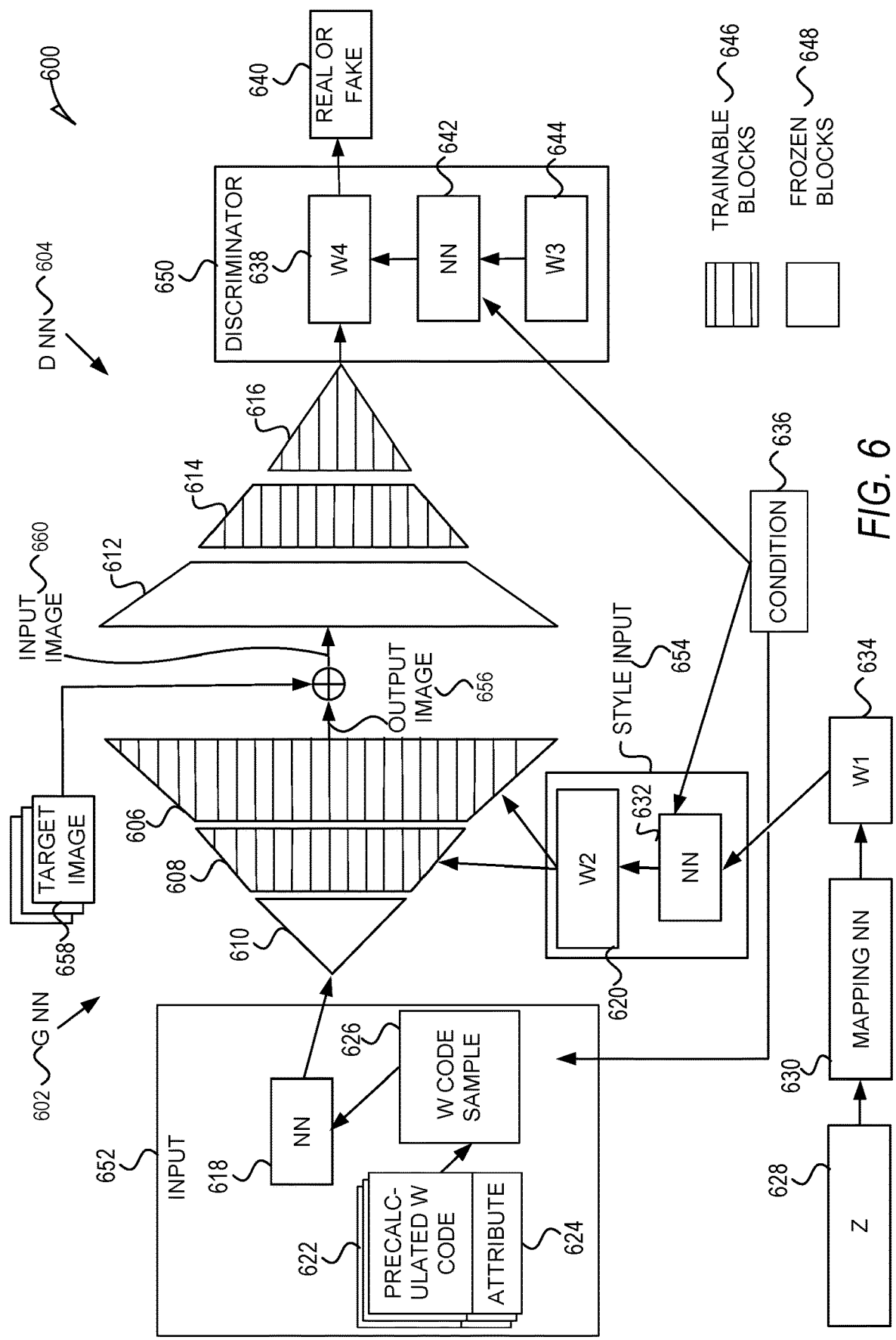
FIG. 6 illustrates a system for a GAN, in accordance with some examples.

FIG. 6 illustrates a system 600 for a GAN, in accordance with some examples. The system 600 includes a generative (G) neural network (NN) 602 and discriminator (D) NN 604. The G NN 602 generates output image 656 based on input 652 and style input 654. Either the output image 656 or target image 658 is fed into the D NN 604 as the input image 660. The D NN 604 determines based on the discriminator 650 and, optionally, the condition 636 whether the input image 660 is fake or real 640. The D NN 604 is used to train the G NN 602.

The D NN 604 and the G NN 602 are alternatively trained so that D NN 604 learns to distinguish whether an input image 660 is from the target image 658, which is termed real, or from the output image 656, which is termed fake. The G NN 602 learns to generate output images 656 that fit the target images 658 to fool the D NN 604 into determining that output images 656 are from the target images 658. Back propagation is used for learning where the target images 658 act as a ground truth for the D NN 604 and the real or fake 640 is used to train G NN 602.

The G NN 602 and D NN 604 are initially trained on a primary image domain. In some examples, the G NN 602 and D NN 604 are pretrained and accessed by the system 600. In some examples, the primary image domain is a dataset of human faces. For example, the target images 658 are a sampling of human faces with a wide range of features. In the initial training of G NN 602 and D NN 604, both the trainable blocks 646 and the frozen blocks 648 are trained. There may be more blocks but a limited number is illustrated for explanatory purposes. The blocks include layers of NN.

The G NN 602 and D NN 604 have trainable blocks 646 and frozen blocks 648. The G NN 602 and D NN 604 are trained on the primary image domain and then trained on a secondary image domain of target images 658. During the training on the secondary image domain of target images 658 some portions of G NN 602 and D NN 604 are frozen blocks 648 that are not trained and other portions of G NN 602 and D NN 604 are trainable blocks 646 where the weights of the G NN 602 and the D NN 604 are trained in accordance with back propagation. A condition 636 is associated with a secondary image domain so that the condition 636 may be used to select the type of output images 656 generated by the G NN 602.

The G NN 602 and D NN 604 are neural networks comprised of different layers 606, 608, 610, of the G NN 602, and layers 612, 614, and 616 of the D NN 604. The layers 606, 608, 610, start from a smaller size image such as 4×4 bits and expand or double at each layer 606, 608, 610 to end with a larger image such as 1024×1024 bits or more. The number of layers 608, 610, 612 is between 10 and 20, in accordance with some examples. For example, the layers 606, 608, 610 may double in the number of bits at each layer 610, 608, 606 by up sampling from the previous layer 606, 608, 610. The layers 606, 608, 610 include one or more convolutional layers, and, optionally, one or more fully connected layers and one or more pooling layers. The output image 656 is converted to RGB using a separate 1×1 convolution layer. The style input 654 is added to layers via Adaptive Instance Normalization (AdaIN). For example, using Equation (1) as follows:

$$AdaIN(x_i, y) = y_{s,i} \frac{x_i - \mu(x_i)}{\sigma(x_i)} + y_{b,i}, \qquad \text{Equation (1)}$$

where i is a single instance of generating the output image 656, x is the feature map from a convolutional layer within layers 606, 608, 610, σ is the standard deviation of $x_i$, μ is the mean of $x_i$, $y_{s,i}$ is the style input 654 from W2 620, and $y_{b,i}$ is random noise (b) for instance i. The output of Equation (1) is then fed into a next level, such as a next convolutional layer, within a layer 606, 608, 610, or to the next layer 606, 608, 610.

W1 634 is an intermediate latent space that is generated by the mapping NN 630. The mapping NN 630 takes as input a random Z 628 or a fixed learned Z 628. The mapping NN 630 is eight fully connected layers and is trained in the backpropagation of G NN 602.

The style input 654 is used in Equation (1) and is generated by the NN 632. The NN 632 is a residual NN that generates W2 620, in accordance with some examples. The NN 632 takes as input the condition 636 and W1 634. The NN 632 is trained with the G NN 602. The condition 636 indicates information about the desired output image 656, such as gender, face type, hair type, color, expression, character identification, and so forth. The condition 636 is a number that is associated with the information or attributes of the desired output image 656 during training of the G NN 602. The condition 636 is used to select the type of output image 656 once the G NN 602 is trained both on the primary image domain and on one or more secondary image domains. The input 652 takes a corresponding W code sample 626 from the precalculated W code 622 associated with attributes 624, which corresponds with the condition 636. The NN 618 is trained with the G NN 602. The precalculated W code 622 is a code or number within the intermediate latent space that has been determined to have associated attribute 624 or condition 636. For example, the precalculated W code 622 may indicate a sex of the face, which may be the same as a value of a condition 636.

The discriminator 650 comprises a NN 642, which, in some examples, is a residual NN. The NN 642 takes as input the condition 636 and W3 644, which is a parameter, and outputs W4 638, which is a position in the intermediate latent space. W3 644 is a value that is a constant or random, in accordance with some examples. The D NN 604 determines a dot product of the output of the D NN 604 with W4 638 to determine whether the input image 660 is real or fake 640. The real or fake 640 value, which may be normalized, is between 0 and 1.

Figure 7:
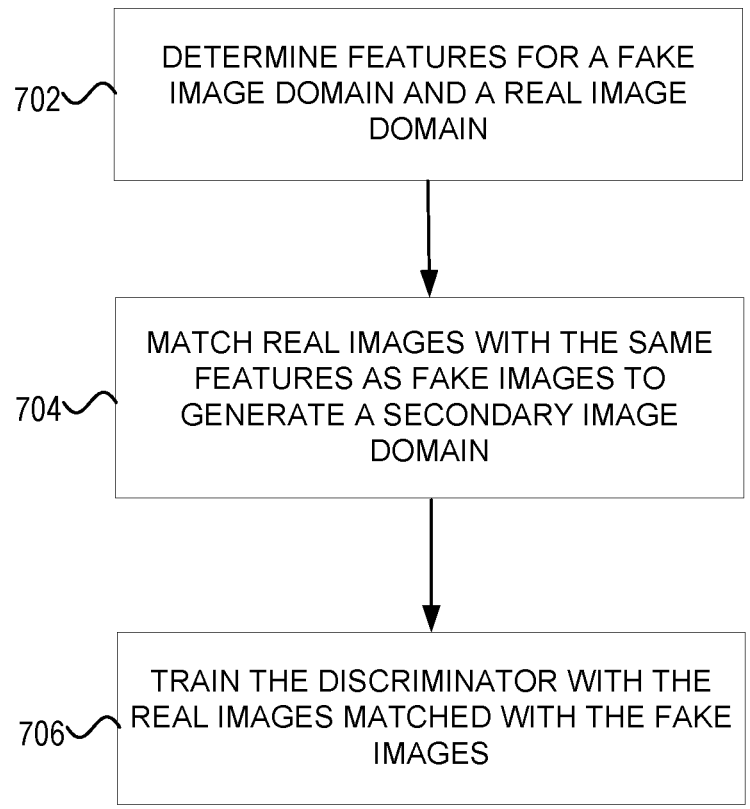
FIG. 7 illustrates a method of training a GAN, in accordance with some examples.
Figure 8:
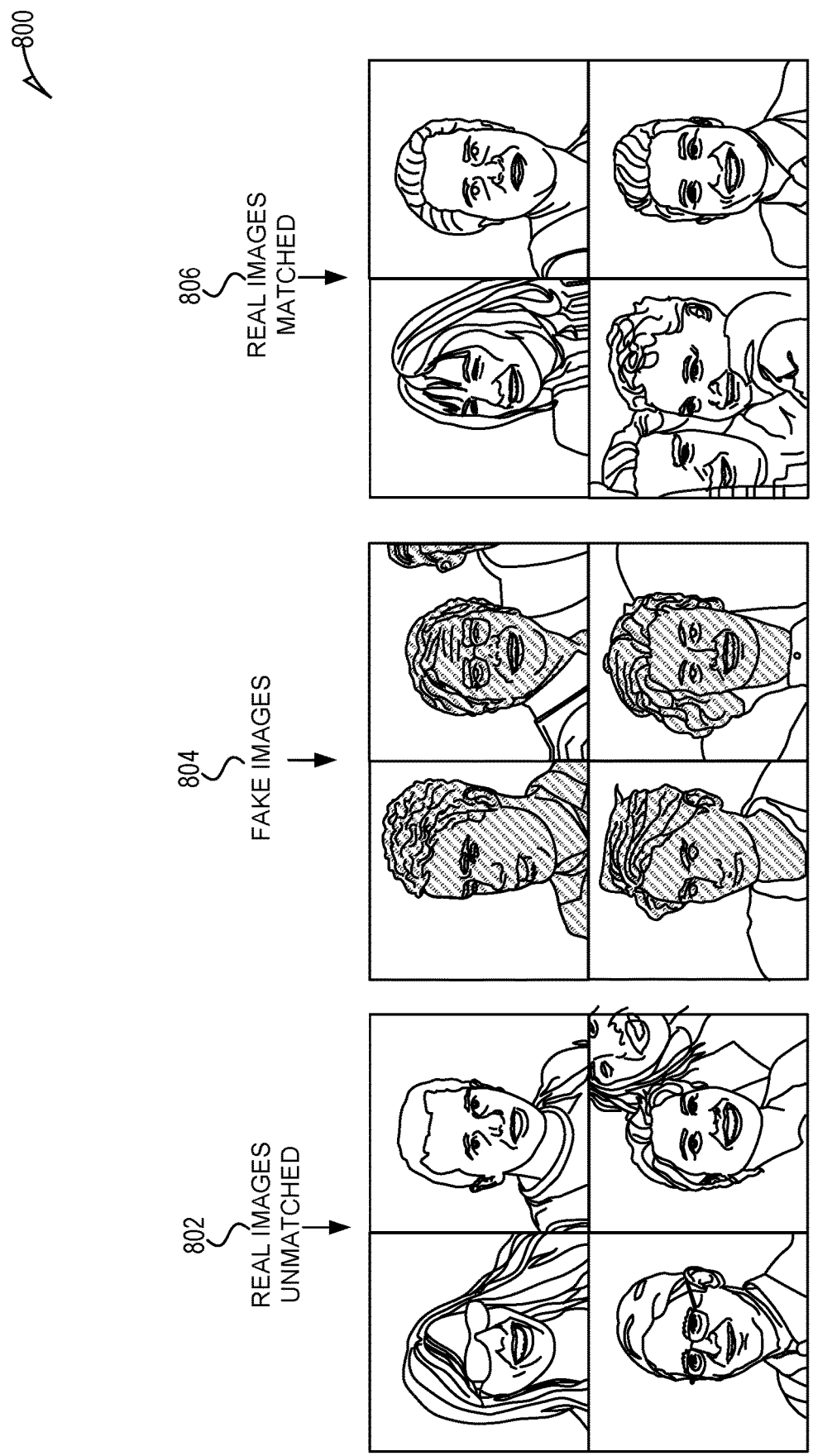
FIG. 8 illustrates real images matched with fake images, in accordance with some examples.
Figure 9:
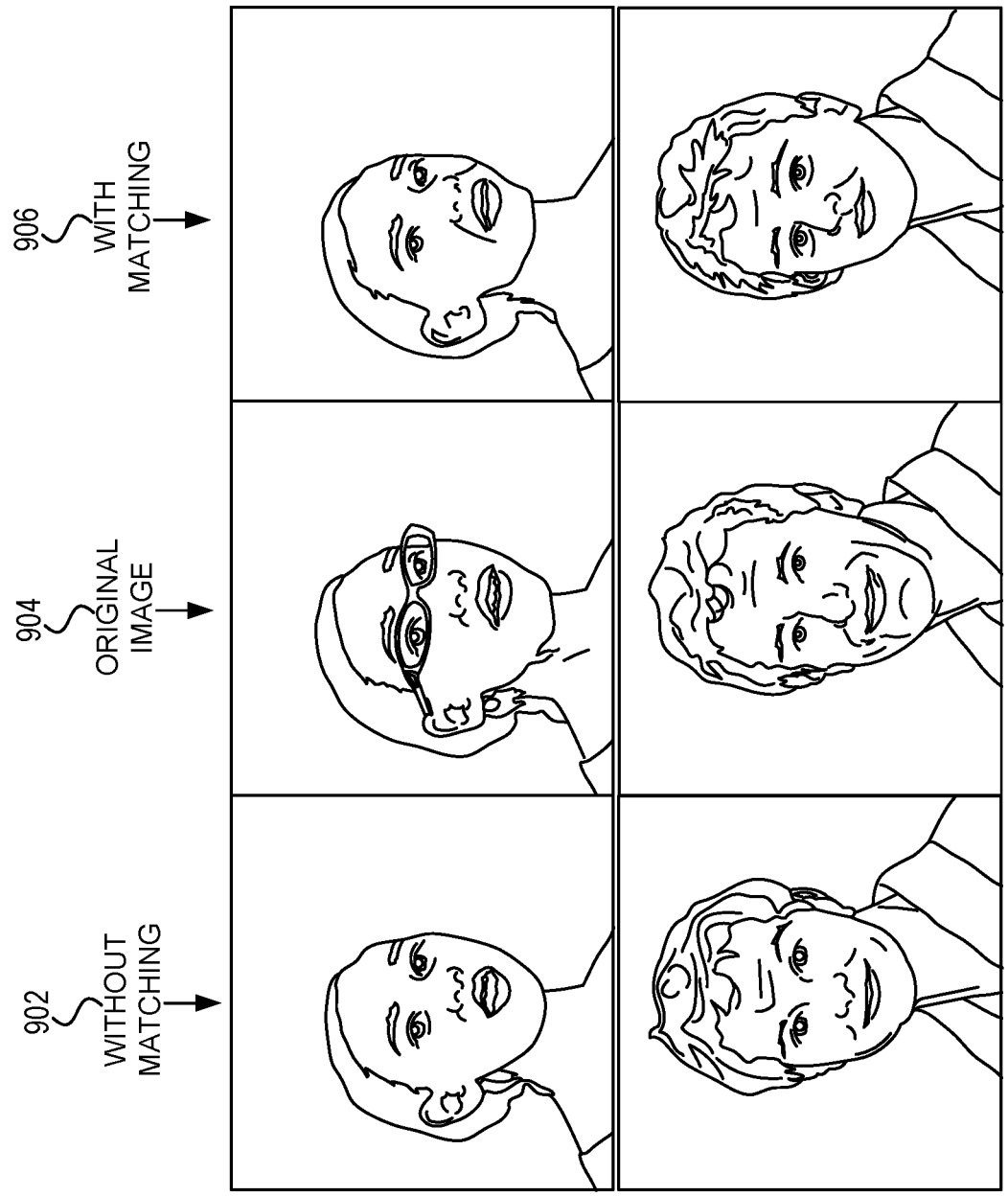
FIG. 9 illustrates generated images from a GAN trained without matching and with matching, in accordance with some examples.

FIGS. 7, 8, and 9 are discussed in conjunction with one another. FIG. 7 illustrates a method 700 of training a GAN, in accordance with some examples. FIG. 8 illustrates real images matched with fake images 800, in accordance with some examples. FIG. 9 illustrates generated images from a GAN trained without matching and with matching, in accordance with some examples. The method 700 of FIG. 7 begins at operation 702 with determining features for a fake image domain and a real image domain. For example, the real images unmatched 802, the fake images 804, and real images matched 806 of FIG. 8 have features such as facial orientation and scale determined for them. In some examples, many more features may be determined. The real images unmatched 802, and real images matched 806 correspond to the target images 658. The lines in the fakes images 804 indicate that the color of the fake images 804 is different than the color of the real images unmatched 802, and the real images matched 806. However, the color of the fake images 804 may be the same as the color of the real images unmatched 802, and the real images matched 806.

The method 700 continues at operation 704 with matching real images with the same features as fake images to generate a secondary image domain. For example, the fake images 804 are generated by G NN 602 where the target images 658 include real images unmatched 802 and real images matched 806. The real images matched 806 are target images 658 that match the features of facial orientation and facial scale of the fake images 804. Notice that features such as gender are not matched. For example, the image on the top right of fake images 804 is matched to the image on the top right of real images matched 806. The orientation of the face and the scale of the face are matched but the gender and color of the faces are not matched.

The method 700 continues at operation 706 with training the discriminator with the real images matched and with the fake images. For example, the fake images 804 and real images matched 806 are used as input image 660 to train the D NN 604. The fake images 804 may have an associated condition 636 that indicates features of the fake images 804.

The number of fake images 804 and real images matched 806 may be a same number in training the D NN 604. By using the real images matched 806 the D NN 604 is trained to find the difference between domains and to only detect domain-related properties. The D NN 604 does not have to discriminate the matched features, so it is more likely to be trained to distinguish the unmatched features.

The method 700 may be performed by one or more devices discussed herein either alone or in conjunction with one another. For example, the client device 102, messaging system 100, or another device may be used to perform method 700. One or more of the operations of method 700 may be optional. Method 700 may include one or more additional operations. One or more operations of method 700 may be performed in a different order.

In some examples, the real images unmatched 802 are the images that are to be used as a ground truth as the target images 658. The G NN 602 and D NN 604 are trained through several batches of output images 656 and target images 658. The G NN 602 is then used to generate a set of fake images 804, which are then matched to the real images unmatched 802. In some examples, a percentage difference between a first number of the real images matched 806 and a second number of the fake images 804 does not transgress a threshold percentage so that the training is based on having the two sets of images being about the same number. The threshold percentage may be 5 to 50 percent.

The real images matched 806 are then used as the target images 658 with the fake images 804 used as the output image 656 for training. Then this process continues where more fake images unmatched 802 are generated by the G NN 602 after training with the previous batch and these fake images unmatched 802 are matched to more real images unmatched 802, which may be a very large set of images. The training progresses in this manner until the G NN 602 and D NN 604 are determined to be trained. A condition 636 may be part of the training. For example, the target images 658 may be cartoon images with big blue noses and a condition 636 value is then assigned to cartoon images with big blue noses.

FIG. 9 illustrates output images 656 without matching 902 and with matching 906 where the original images 904 are merged. The with matching 906 images are more natural looking with the head pose being closer to the original images 904 as a result of using matching. The training of the D NN 604 trains the G NN 602 as well in the adversarial training. The matching may be used in both a primary image domain and a secondary image domain. For example, in the primary image domain all the blocks are trainable blocks 646 but in the secondary image domain some of the blocks are frozen blocks 648 as described above.

Figure 10:
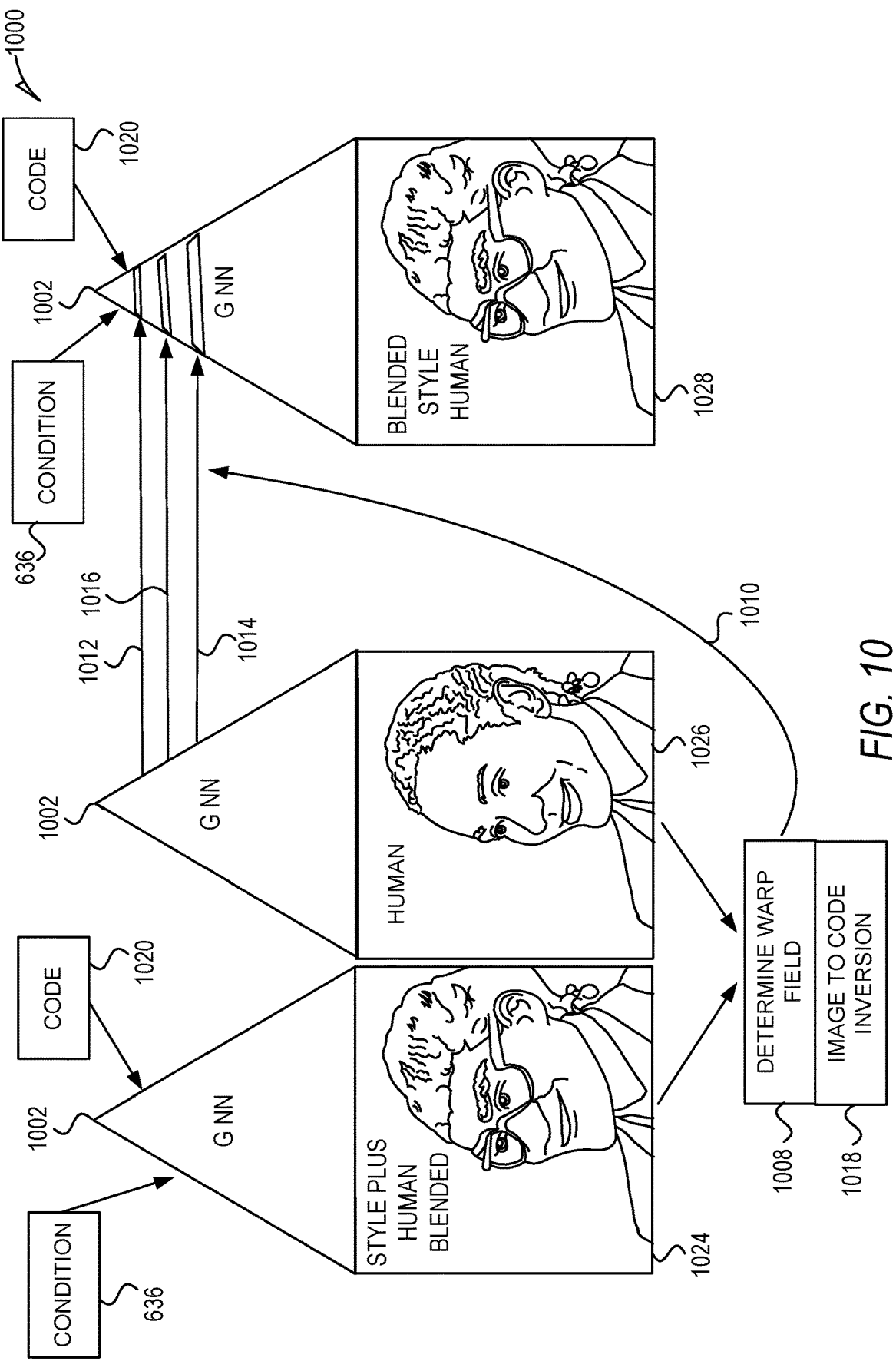
FIG. 10 illustrates feature blending, in accordance with some examples.

FIG. 10 illustrates feature blending 1000, in accordance with some examples. A human 1026 image is accessed or generated by the G NN 1002. A human 1026 image to a code inversion is performed to determine the W code, such as W1 634, that would have generated the human 1026 image or an image close to the human 1026 image if the W1 634 were used as input to the G NN 1002. For example, image to code inversion 1018 module takes a human 1026 image and determines a code 1020 such as W1 634. The code 1020 is then used by the G NN 1002 to generate the style plus human blended 1024 image by using the code 1020 and a condition 636 to generate the style plus human blended 1024 image of the human 1026 image. The G NN 1002 is G NN 602 where the primary image domain is human face images, and the secondary image domain is cartoon human face images and the code 1020 indicates cartoon human face.

The code 1020 with a condition 636 for cartoon of human face images is then used by the G NN 1002 to generate the style plus human blended 1024 image. For example, the system 600 is first trained with target images 658 of human faces and then trained using frozen blocks 648 and trainable blocks 646 with images of cartoon human face images with a value of the condition 636 that indicates that the G NN 602 is to generate cartoon human face images.

After the style plus human blended 1024 image and the human 1026 image are obtained, then a warp field 1010 is determined between the human 1026 image and the style plus human blended 1024 image. The warp field 1010 may be determined by the determine warp field 1008 module based on face landmarks correspondence. For example, the eyes, nose, mouth, ears, and chin are identified in each image and then a warp field 1010 is determined that would warp the style plus human blended 1024 image into a similar face position as the human 1026 image.

The warp field 1010 is then fed into the feature map of the G NN 1002 at a layer. For example, the warp field 1010 may be blended with the feature map that feeds into the layer of the G NN 1002 that generates a 32×32 pixel image. The blended style human 1028 image looks more natural as it has the same facial orientation as the human 1026 image.

Table 1 illustrates style codes where the style code value indicates how values for the different style codes can be used to determine the form of the image generated by the G NN 1002. The style codes correspond to the condition 636, in accordance with some examples.

TABLE 1

Style Codes

| Style Code | Feature |
|---|---|
| 0 | Orientation |
| 1 | Orientation |
| 2 | Orientation/Face shape |
| 3 | Orientation Face Shape |
| 4 | Character/face shape/face orientation |
| 5 | Character/face shape |
| 6 | Mouth global light |
| 7 | Mouth global light |
| 8 | Eyes/local shadows |
| 9 | Eyes/local shadows |
| 10 | Skin tone |

Figure 12:
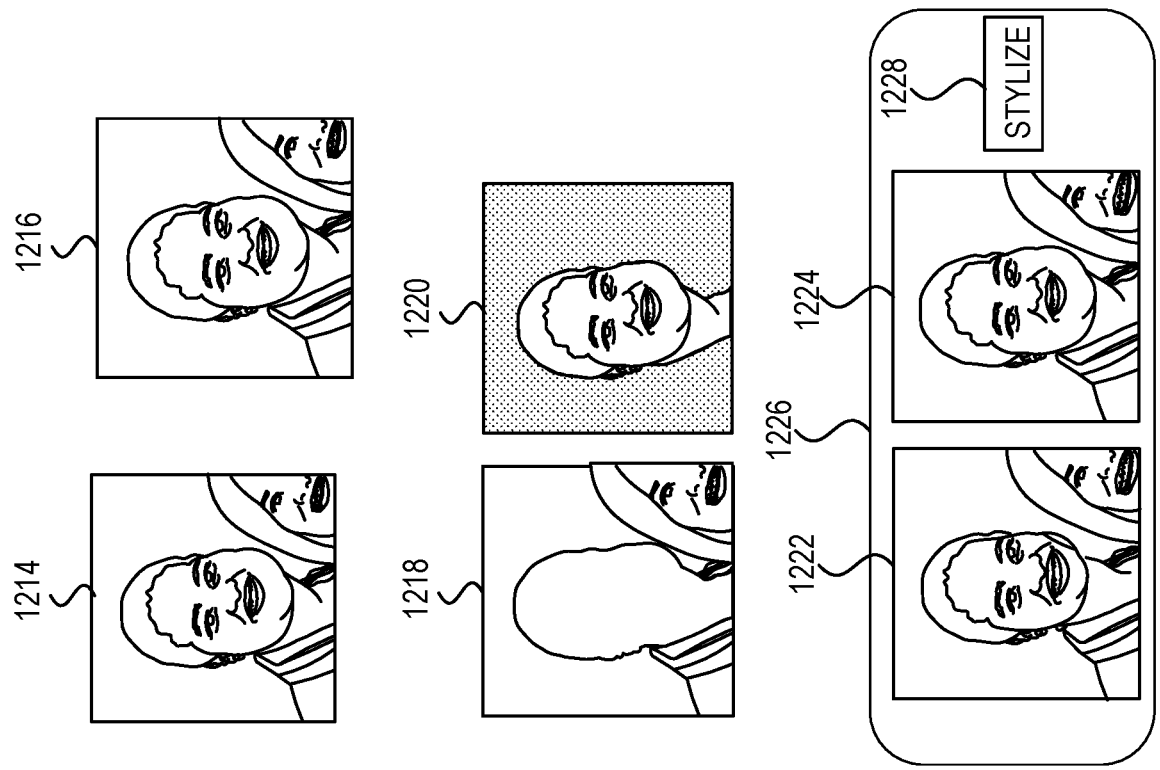
FIG. 12 illustrates alpha blending a background of a base image with a face of a stylized face image, in accordance with some examples.
Figure 12:
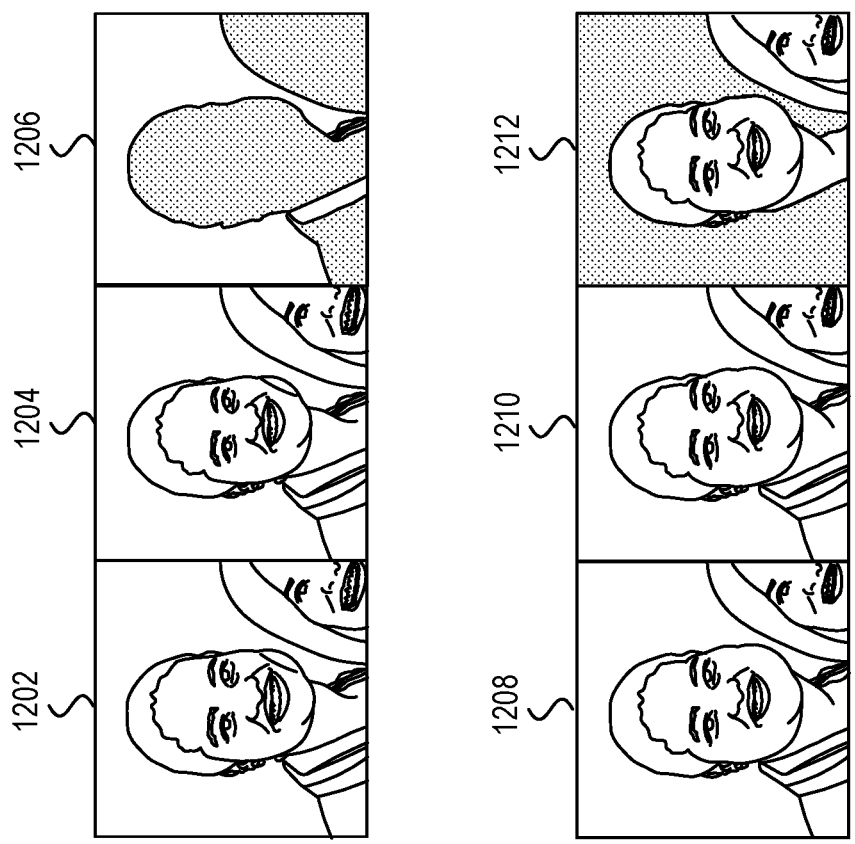

Additionally, alpha blending 1016 may be performed where the face of the blended style human 1028 image is alpha blended with the background of the human 1026 image. In some examples, the human 1026 image is warped to a center position, the blended style human 1028 image is warped to a center position, and then the blended style human 1028 image is alpha blended with the background of the human 1026 image. The operations may be performed by a module or by layers of the G NN 1002. The alpha blending is illustrated in FIG. 12. In some examples, poison blending at a layer of the G NN 1002 that generates a 32×32 feature map is performed with the human 1026 image and the style plus human blended 1024 image where the skin tones are poison blended with one another. The poison blending is performed by a module in some examples. In some examples, the poison blending 1012 is performed by a layer of the G NN 1002 where the human 1026 image is fed into the features of a layer of the G NN 1002.

Figure 11:
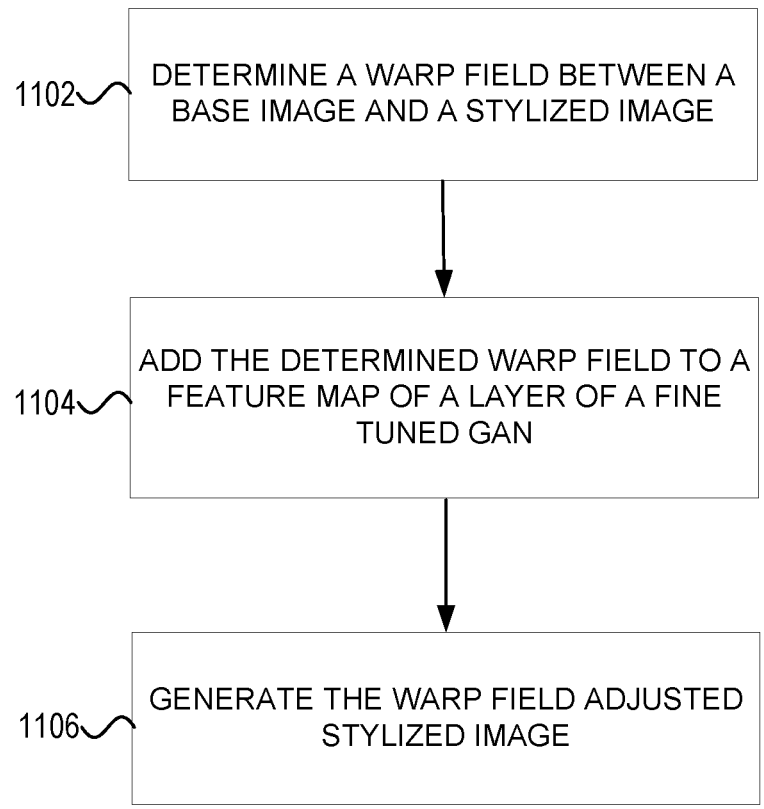
FIG. 11 illustrates a method of generating an adjusted stylized face image, in accordance with some examples.

FIG. 11 illustrates a method 1100 of generating an adjusted stylized face image, in accordance with some examples. The method 1100 begins at operation 1102 with determining a warp field between a base image and a stylized image. For example, the determine warp field 1008 module may determine the warp field 1010 based on style plus human blended 1024 image and human 1026 image. In some examples, the G NN 1002 determines the warp field 1014 based on layers of the G NN 1002 and the condition 636 and, optionally, the code 1020.

The method 1100 continues at operation 1104 with adding the determined warp field to a feature map of a layer of a fine-tuned GAN. For example, the warp field 1010 or warp field 1014 is added to the G NN 1002. The warp field 1010, 1014 is added to a feature map of a layer of the G NN 1002 such as the layer that generates a 32×32 bit image.

The method 1100 continues at operation 1106 with generating the warp field adjusted stylized image. For example, the G NN 1002 may continue after the warp field 1010, 1014 is blended with a feature map of one of the layers of the G NN 1002 and generate the blended style human 1028.

The method 1100 optionally includes before operation 1106 adding poison blending of the stylized image and the base image to a feature map of the G NN 1002. For example, a module may determine the poison skin tone blending of the style plus human blended 1024 image and the human 1026 image. In some examples, the G NN 1002 determines the poison blending skin tone based on layers of the G NN 1002 and the condition 636 and, optionally, the code 1020. In some examples, the base image is warped to a center of the base image before the background is determined.

The method 1100 optionally includes before operation 1106 alpha blending the warp field adjusted stylized image with a background of the base image. For example, a module may determine the background of the base image and alpha blend a face portion of the warp field adjusted stylized image with the background. In some examples, the G NN 1002 determines the background of the base image and layers of the G NN 1002 blend the face portion of the ward field adjusted stylized image with the background of the base image.

The method 1100 may be performed by one or more devices discussed herein either alone or in conjunction with one another. For example, the client device 102, messaging system 100, or another device may be used to perform method 1100. One or more of the operations of method 1100 may be optional. Method 1100 may include one or more additional operations. One or more operations of method 1100 may be performed in a different order.

FIG. 12 illustrates alpha blending a background of a base image with a face of a stylized face image, in accordance with some examples. The image 1202 is warped so that a source face is warped to a center of image 1204. The image 1206 illustrates the background of image 1204. The image 1208 illustrates a stylized face generated by a G NN based on the face of image 1202. The image 1210 illustrates the stylized face of image 1208 warped to the center of the image 1210. The image 1212 illustrates the foreground or faces of the image 1210. Image 1214 illustrates the result of alpha blending image 1206 with image 1212 within a G NN. Image 1216 illustrates image 1214 with poison skin tone blending as described above performed by the G NN. Image 1218 illustrates the background of image 1204 where only the one stylized face is kept. Image 1220 illustrates the stylized face of image 1216 with only the stylized face kept in the image. Image 1222 illustrates the image 1202 and image 1224 illustrates image 1218 and image 1220 alpha blended together. Image 1222 is the original image such as an image capture on the device 1226 and image 1224 is the cartoon or stylized version of the original image 1222. The device 1226 is a client device 102 with image capturing capabilities, in accordance with some examples. A user of the device 1226 selected a user interface item such as stylize 1228 to generate image 1224 from image 1222.

Figure 13:
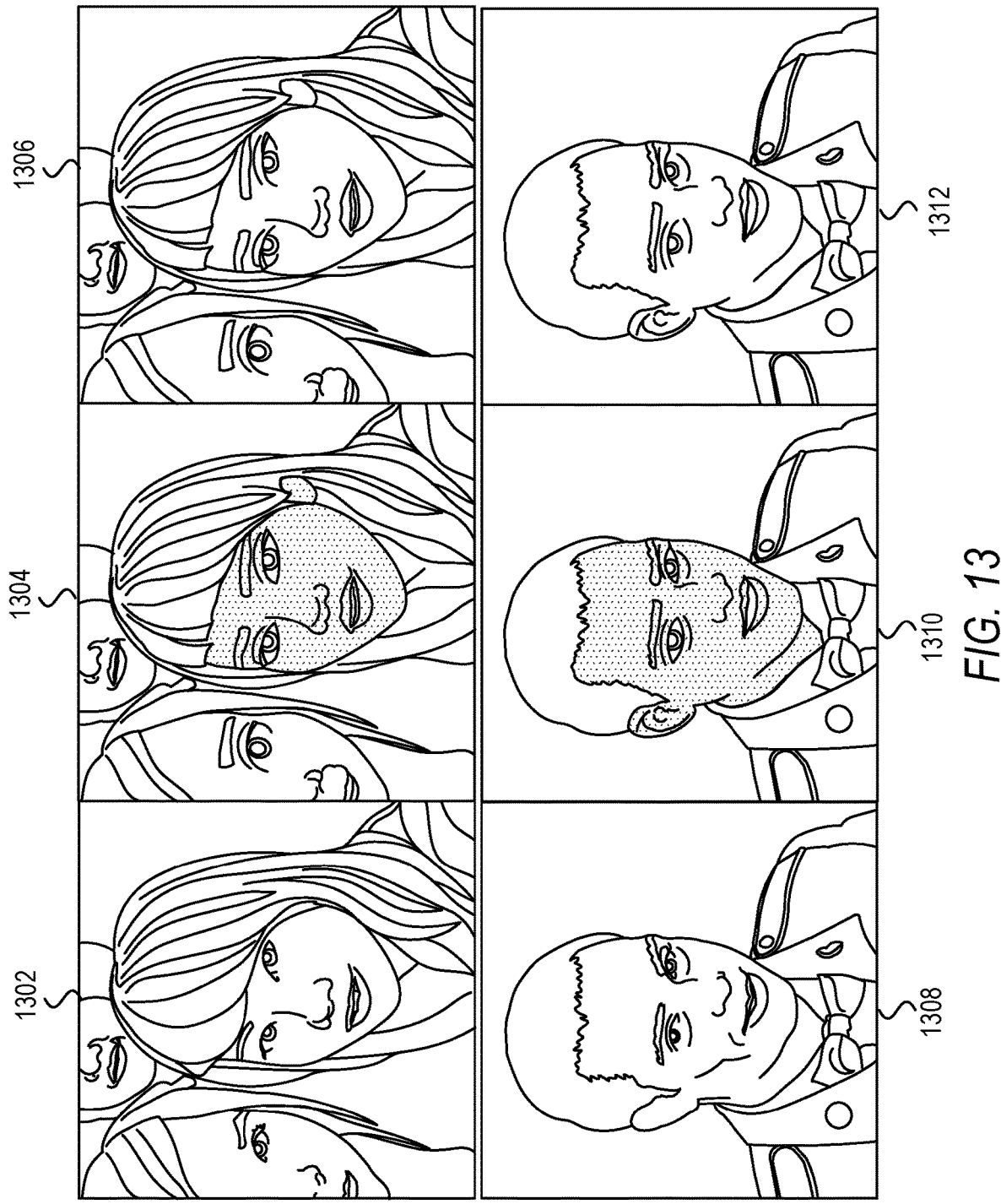
FIG. 13 illustrates poison blending, in accordance with some examples.

FIG. 13 illustrates poison blending, in accordance with some examples. FIG. 13 illustrates the skin color poison blending as described above. Images 1302, 1308 are blended with images 1304, 1310, respectively, to generate images 1306, 1312, respectively.

Figure 14:
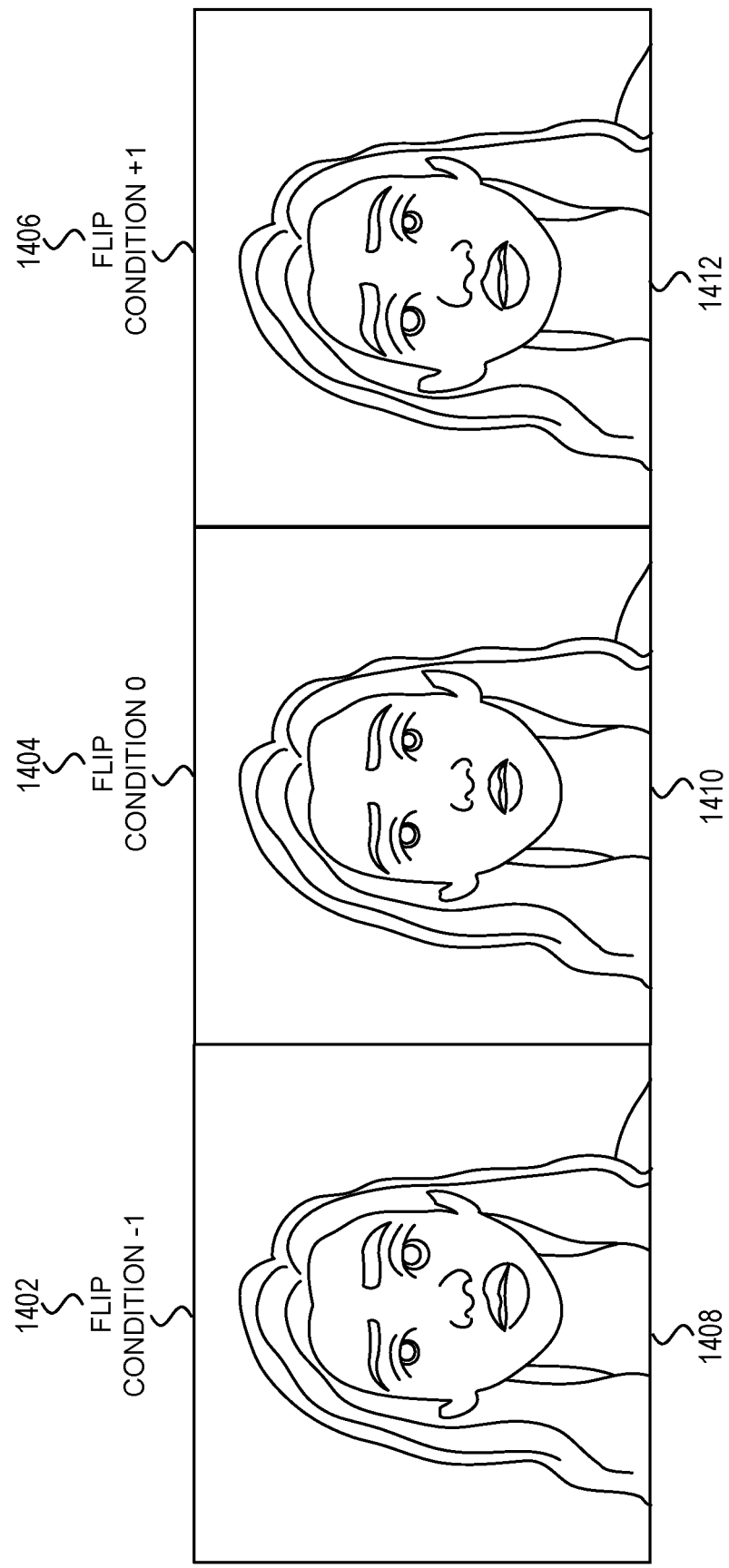
FIG. 14 illustrates dataset asymmetry, in accordance with some examples.

FIG. 14 illustrates dataset asymmetry, in accordance with some examples. The target dataset such as target images 658, which are used to train the G NN 602 and D NN 604, may be asymmetric. For example, in FIG. 14 image 1408 has a flip condition −1 1402, which indicates that the face is asymmetric. Image 1412 has a flip condition +1 1406, which indicates that the face is asymmetric in the other way as image 1408. The image 1410 has a flip condition 0 1404, which indicates that the face is symmetric. A module or NN is used to determine the symmetry of the images 1408, 1410, 1412. In some examples, the training of G NN 602 and D NN 604 is modified to include a condition 636 to indicate an indication of a symmetry value of the target image 658. The condition 636 is then used to generate only symmetric images by the G NN 602 by using the condition 636 for a symmetric image. The condition 636 may be termed a condition value input. Other types of categories of the target image 658 can be categorized with condition 636.

Figure 15:
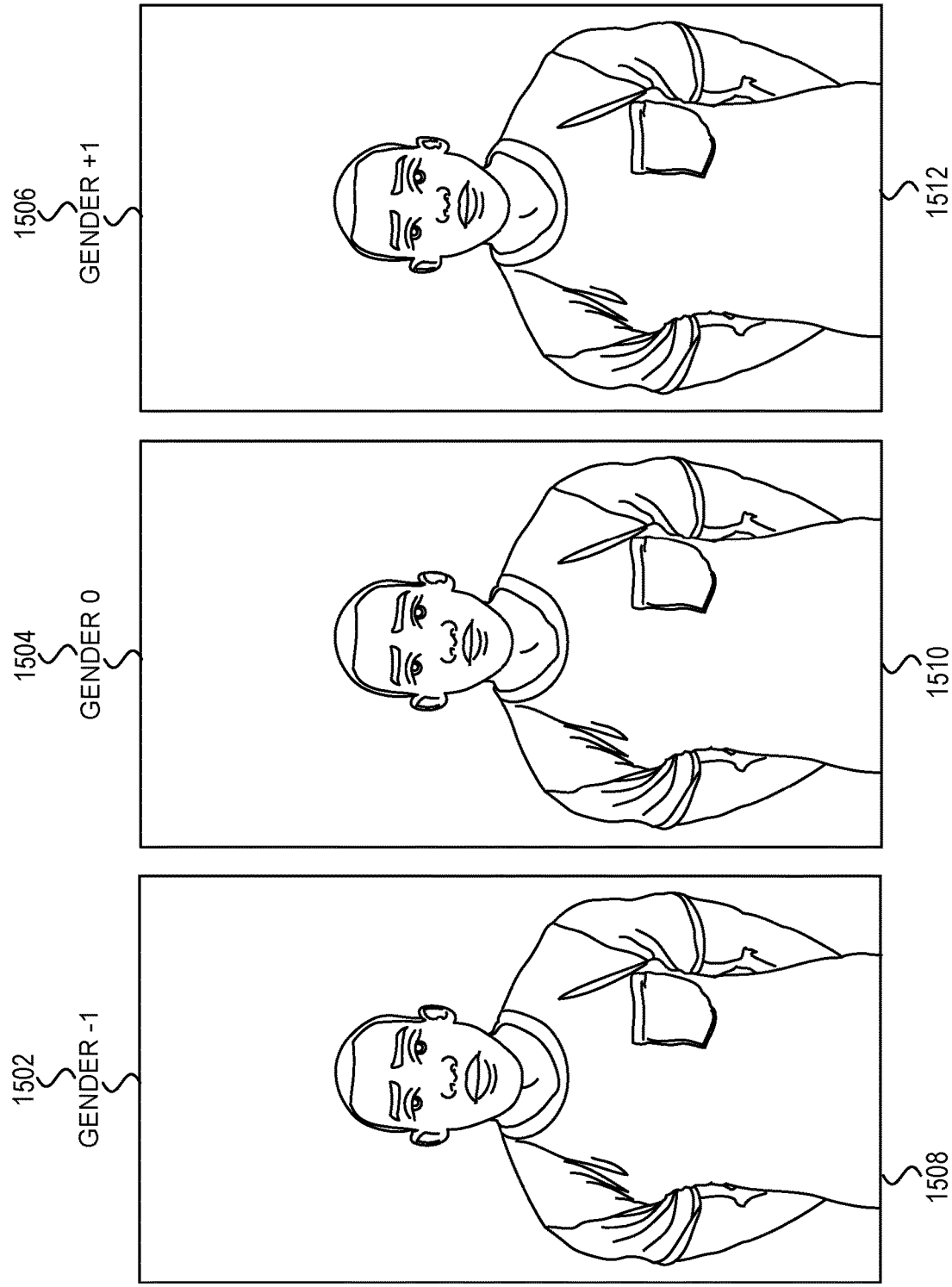
FIG. 15 illustrates dataset asymmetry, in accordance with some examples.

FIG. 15 illustrates dataset asymmetry, in accordance with some examples. The target dataset is assigned values of gender −1, gender 0, or gender +1, with each having a corresponding condition 636. Gender −1 1502 of image 1508 indicates strongly masculine. Gender 0 1504 of image 1510 indicates a neutral male gender. Gender +1 1506 of image 1512 indicates a feminine masculine gender. The training of G NN 602 and D NN 604 is modified as described in conjunction with FIG. 14 where condition 636 is used to train the G NN 602 and D NN 604 with a gender condition of −1, 0, or +1. Then a gender can be selected for generation by the G NN 602 by setting the appropriate value of condition 636.

Figure 16:
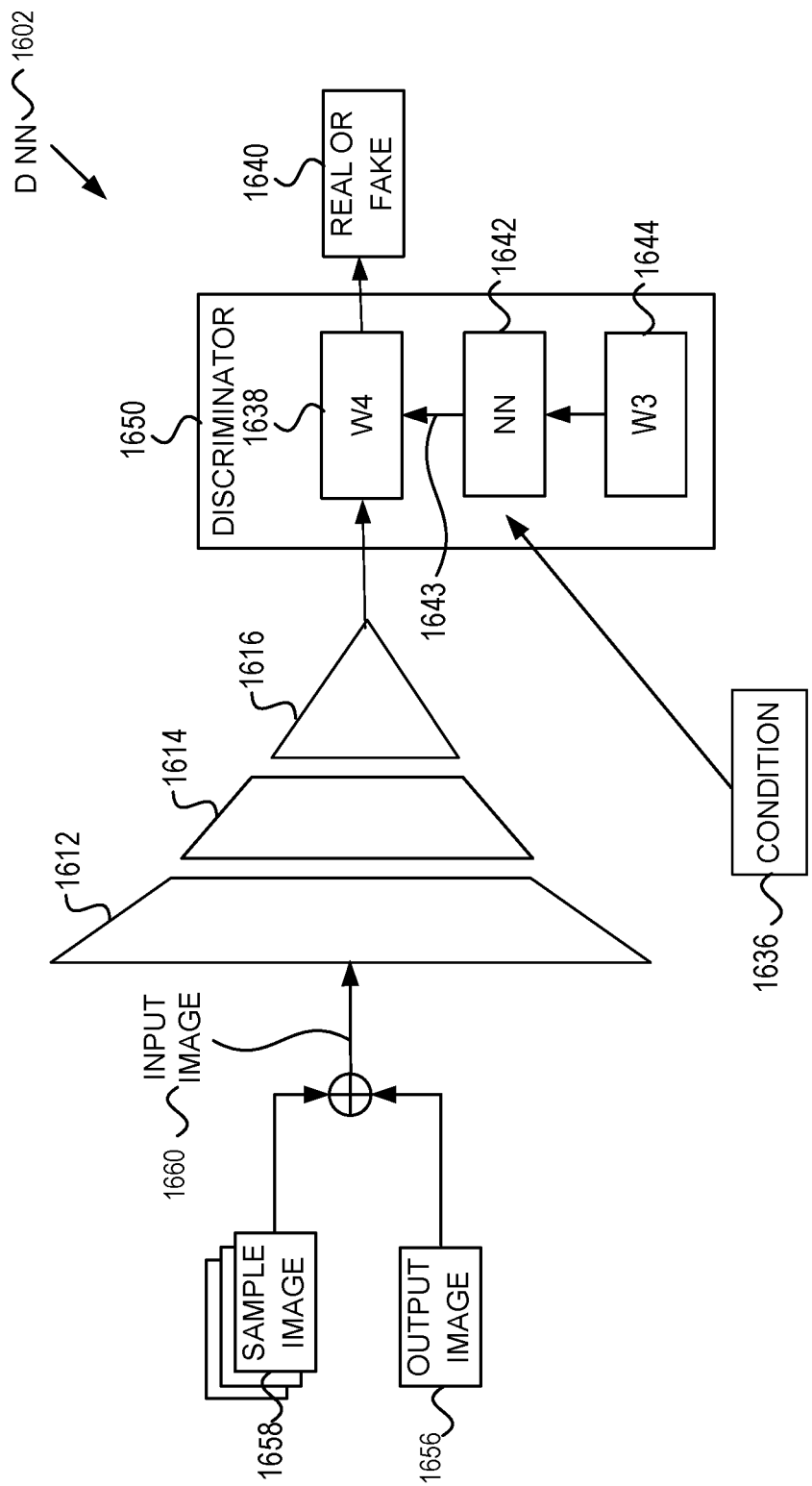
FIG. 16 illustrates a discriminator network, in accordance with some examples.

FIG. 16 illustrates a discriminator network, in accordance with some examples. The discriminator neural network (D NN) 1602 is trained to determine the difference between an input image 1660 from sample images 1658 and an output image 1656 of a generative neural network (G NN). The D NN 1602 comprises layers 1612, 1614, 1616 with weights that are adjusted in accordance with back propagation based on whether the D NN 1602 correctly determined whether the input image 1660 was a fake (the output image 1656) or real (the sample image 1658). The sample images 1658 may be termed a primary domain. An example of primary images is ordinary faces of people such as image 1222 of FIG. 12. The D NN 1602 is trained on the primary domain and then may be trained or fine-tuned using a secondary domain, which may be images such as cartoon images of faces. The D NN 1602 may be trained on multiple secondary domains. One or more of the layers 1612, 1614, 1616 are frozen, which means that their weights are not adjusted during training, for the fine tuning of the D NN 1602. Additionally, a condition 1636 is associated with the secondary domain that is used so that the D NN 1602 can be used to discriminate on both the primary domain and the secondary domain based on the value of the condition 1636.

The D NN 604 determines based on the discriminator 1650 and, optionally, the condition 1636 whether the input image 1660 is fake or real 1640. The discriminator 1650 comprises a NN 1642, which, in some examples, is a residual NN. The NN 1642 takes as input the condition 636 and W3 1644, which is a parameter, and produces an output 1643. W3 644 is a parameter that takes on different values, in accordance with some examples. The discriminator 1650 determines a dot product of W4 1638, which is the output of layer 1616, with the output 1643 to determine whether the input image 1660 is real or fake 640. The real or fake 1640 value, which may be normalized, is between 0 and 1 where a value of 1 indicates a certainty that the input image 660 is real and a value of 0 indicates a certainty that the input image 1660 is fake. The values between 0 and 1 may be a probability estimate that the input image 660 is real. In some examples, the D NN 1602 is used with G NN 602 of FIG. 6.

Figure 17:
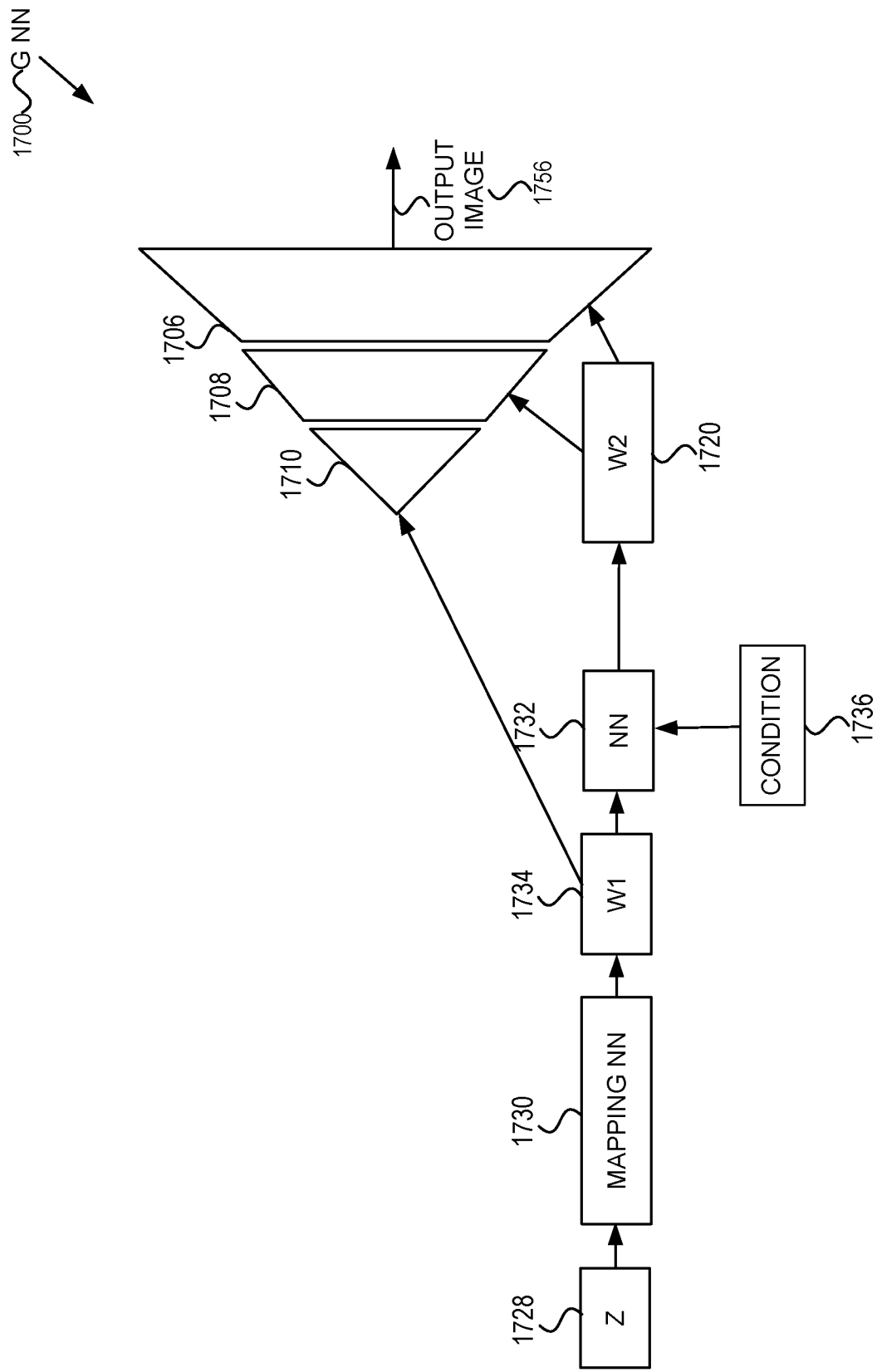
FIG. 17 illustrates a generative neural network (G NN), in accordance with some examples.

FIG. 17 illustrates a generative neural network (G NN) 1700, in accordance with some examples. The G NN 1700 is comprised of different layers 1706, 1708, and 1710. The layers 1706, 1708, 1710, start with W1 1734 as input and generate progressively larger images such as starting with 4×4 bits and expanding or doubling at each layer 1706, 1708, 1710 to end with a larger image such as 1024×1024 bits or more. The number of layers 1706, 1708, 1710 is between 10 and 20, in accordance with some examples. The layers 1706, 1708, 1710 includes one or more convolutional layers, and, optionally, one or more fully connected layers, and one or more pooling layers. The output image 1756 is converted to RGB using a separate 1×1 convolution layer. The W2 1720 is added to layers via Adaptive Instance Normalization (AdaIN). For example, using Equation (1) as follows:

$$AdaIN(x_i, y) = y_{s,i}\frac{x_i - \mu(x_i)}{\sigma(x_i)} + y_{b,i}, \quad \text{Equation (1)}$$

where i is a single instance of generating the output image 1756, x is the feature map from a convolutional layer within layers 1706, 1708, 1710, $\sigma$ is the standard deviation of $x_i$, $\mu$ is the mean of $x_i$, $y_{s,i}$ is the style input from W2 1720, and $y_{b,i}$ is random noise (b) for instance i. The output of Equation (1) is then fed into a next level, such as a next convolutional layer, within a layer 1706, 1708, 1710, or to the next layer 1706, 1708, 1710.

W1 1734 is an intermediate latent space that is generated by the mapping NN 1730. The mapping NN 1732 takes as input a random Z 1728 or a fixed learned Z 1728. The mapping NN 1730 is eight fully connected layers and is trained in the backpropagation of G NN 1700.

The style input is used in Equation (1) and is generated by the NN 1732. The NN 1732 is a residual NN that generates W2 1720, in accordance with some examples. The NN 1732 takes as input the condition 1736. The NN 1732 is trained with the G NN 602. The condition 1736 indicates information about the desired output image 1756 such as gender, face type, hair type, color, expression, character identification, cartoon, and generally relates to feature of a domain of images or to a domain of images. The condition 1736 is a number that is associated with the information or attributes of the desired output image 1756 during training of the G NN 1700 and a D NN. For example, a condition 1736 value corresponds to target images 658 of FIG. 6 of cartoon faces. The condition 1736 is used to select the primary image domain or one or more second image domains for the output image 1756 once the G NN 1700 is trained both on the primary image domain and one or more secondary image domains. The G NN 1700 used as the G NN 602 of FIG. 6, in accordance with some examples.

Figure 18:
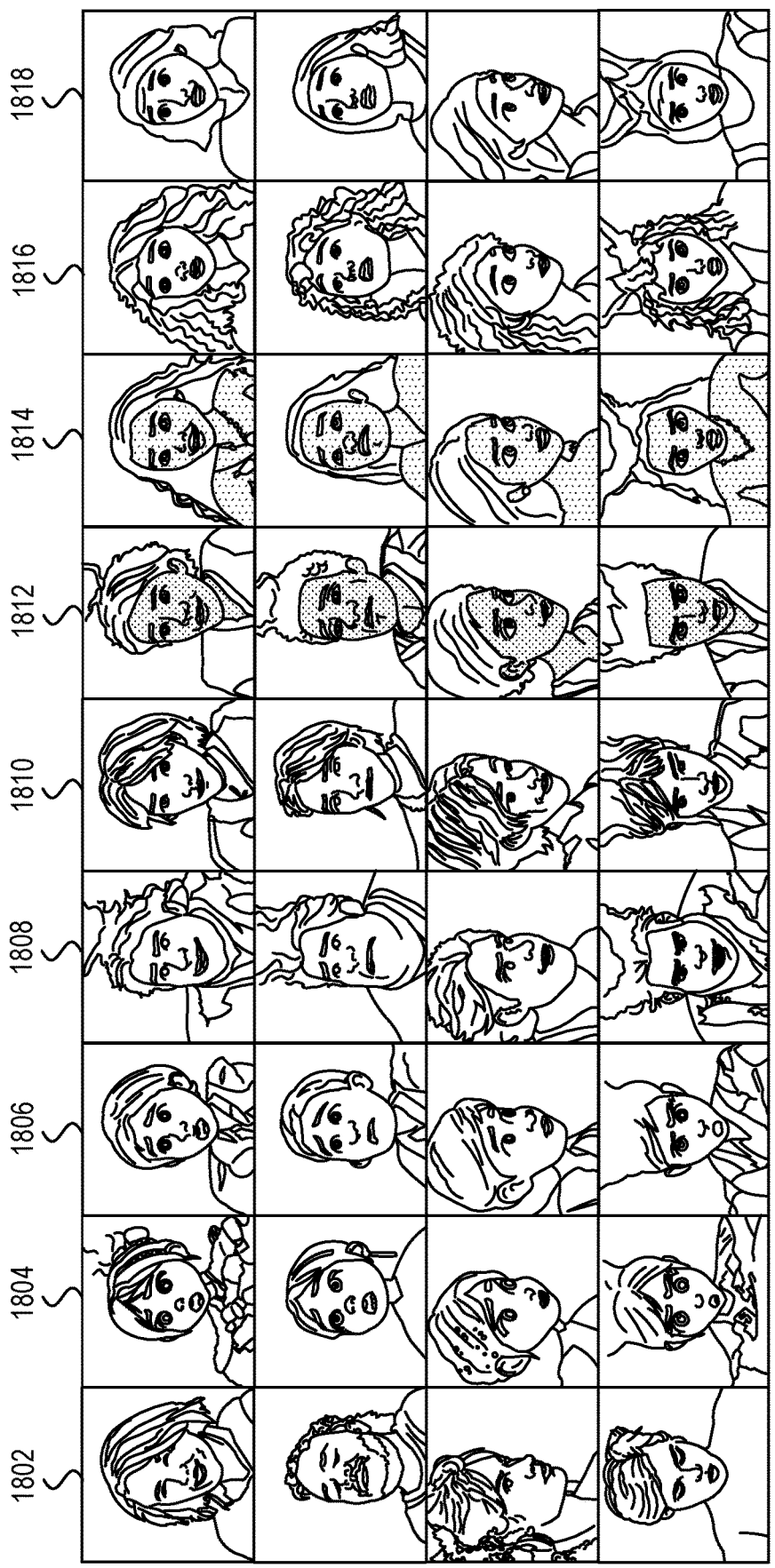
FIG. 18 illustrates the operation of a generative neural network on different characters, in accordance with some examples.

FIG. 18 illustrates the operation of a generative neural network on different characters, in accordance with some examples. Column 1802 is images that are original images such as image 1222. For example, the images of column 1802 may have been captured on a portable image capturing device such as client device 102. Columns 1804, 1806, 1808, 1810, 1812, 1814, 1816, and 1818 are the merging of the images of column 1802 with a corresponding character of the column 1804, 1806, 1808, 1810, 1812, 1814, 1816, and 1818. The images in columns 1804, 1806, 1808, 1810, 1812, 1814, 1816, and 1818 take the role image 1224 of FIG. 12. The images in columns 1804, 1806, 1808, 1810, 1812, 1814, 1816, and 1818 are generated by a G NN such as G NN 602 or G NN 1700 with a value of the condition 1736 selecting the column 1804, 1806, 1808, 1810, 1812, 1814, 1816, and 1818. The stylize 1228 user interface item of FIG. 12 may have an option to select which character of the columns 1804, 1806, 1808, 1810, 1812, 1814, 1816, and 1818 to merge the image 1222.

Figure 19:
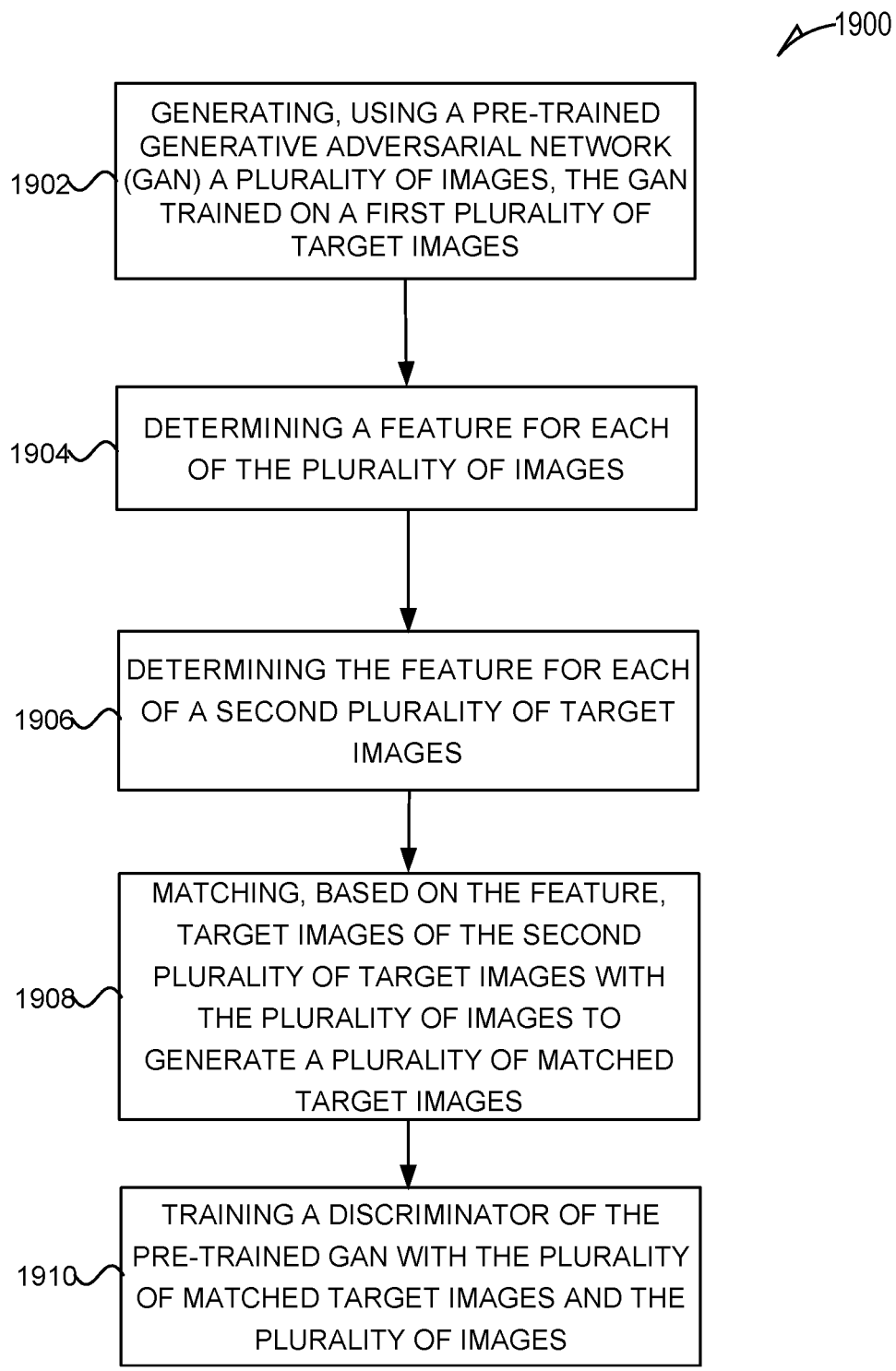
FIG. 19 illustrates a method domain changes in generative adversarial networks, in accordance with some examples.

FIG. 19 illustrates a method 1900 domain changes in generative adversarial networks, in accordance with some examples. The method 1900 begins at operation 1902 with generating, using a pre-trained generative adversarial network (GAN) a plurality of images, the GAN trained on a first plurality of target images. For example, G NN 602 is used to generate a plurality of output images 656.

The method 1900 continues at operation 1904 with determining a feature for each of the plurality of images. For example, the real images unmatched 802, the fake images 804, and real images matched 806 of FIG. 8 have features such as facial orientation and scale determined for them. The real images unmatched 802 and real images matched 806 correspond to the target images 658. The lines in the fake images 804 indicate that the color of the fake images 804 is different than the color of the real images unmatched 802 and the real images matched 806. The fake images 804 may be the same color as the color of the real images unmatched 802 and the real images matched 806.

The method 1900 continues at operation 1906 with determining the feature for each of a second plurality of target images. For example, a module that is part of the GAN image generation system 216 determines the feature for each of the real images matched 806.

The method 1900 continues at operation 1908 with matching, based on the feature, target images of the second plurality of target images with the plurality of images to generate a plurality of matched target images. For example, a module that is part of the GAN image generation system 216 matches real images matched 806 with the fake images 804.

The method 1900 continues at operation 1910 with training a discriminator of the pre-trained GAN with the plurality of matched target images and the plurality of images. For example, a module that is part of the GAN image generation system 216 performs training of the D NN 604 of FIG. 6 as is disclosed herein.

The method 1900 may be performed by one or more device discussed herein either alone or in conjunction with one another. For example, the client device 102, messaging system 100, or another device, may perform the method 1900 either alone or in conjunction with one another. One or more of the operations of method 1900 may be optional. Method 1900 may include one or more additional operations. One or more operations of method 1900 may be performed in a different order.

Machine Architecture

Figure 20:
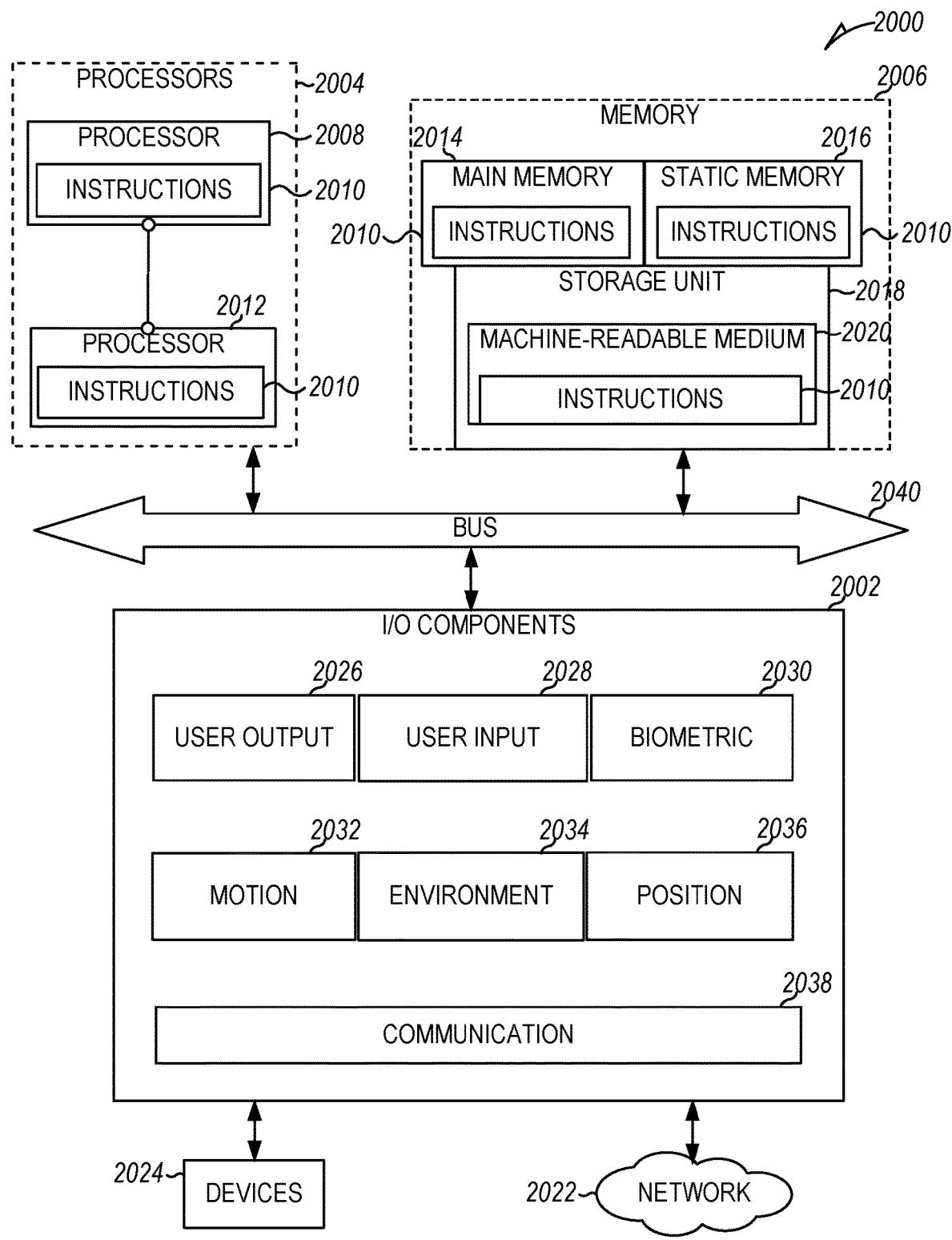
FIG. 20 is a diagrammatic representation of a machine in the form of a computer system within which a set of instructions may be executed for causing the machine to perform any one or more of the methodologies discussed herein, in accordance with some examples.

FIG. 20 is a diagrammatic representation of the machine 2000 within which instructions 2010 (e.g., software, a program, an application, an applet, an app, or other executable code) for causing the machine 2000 to perform any one or more of the methodologies discussed herein may be executed. For example, the instructions 2010 may cause the machine 2000 to execute any one or more of the methods described herein. The instructions 2010 transform the general, non-programmed machine 2000 into a particular machine 2000 programmed to carry out the described and illustrated functions in the manner described. The machine 2000 may operate as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2010, sequentially or otherwise, that specify actions to be taken by the machine 2000. Further, while only a single machine 2000 is illustrated, the term "machine" shall also be taken to include a collection of machines that individually or jointly execute the instructions 2010 to perform any one or more of the methodologies discussed herein. The machine 2000, for example, may comprise the client device 102 or any one of a number of server devices forming part of the messaging server system 108. In some examples, the machine 2000 may also comprise both client and server systems, with certain operations of a particular method or algorithm being performed on the server-side and with certain operations of the particular method or algorithm being performed on the client-side.

The machine 2000 may include processors 2004, memory 2006, and input/output I/O components 2002, which may be configured to communicate with each other via a bus 2040. In an example, the processors 2004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2008 and a processor 2012 that execute the instructions 2010. The term "processor" is intended to include multi-core processors that may comprise two or more independent processors (sometimes referred to as "cores") that may execute instructions contemporaneously. Although FIG. 20 shows multiple processors 2004, the machine 2000 may include a single processor with a single-core, a single processor with multiple cores (e.g., a multi-core processor), multiple processors with a single core, multiple processors with multiples cores, or any combination thereof.

The memory 2006 includes a main memory 2014, a static memory 2016, and a storage unit 2018, both accessible to the processors 2004 via the bus 2040. The main memory 2006, the static memory 2016, and storage unit 2018 store the instructions 2010 embodying any one or more of the methodologies or functions described herein. The instructions 2010 may also reside, completely or partially, within the main memory 2014, within the static memory 2016, within machine-readable medium 2020 within the storage unit 2018, within at least one of the processors 2004 (e.g., within the Processor's cache memory), or any suitable combination thereof, during execution thereof by the machine 2000.

The I/O components 2002 may include a wide variety of components to receive input, provide output, produce output, transmit information, exchange information, capture measurements, and so on. The specific I/O components 2002 that are included in a particular machine will depend on the type of machine. For example, portable machines such as mobile phones may include a touch input device or other such input mechanisms, while a headless server machine will likely not include such a touch input device. It will be appreciated that the I/O components 2002 may include many other components that are not shown in FIG. 20. In various examples, the I/O components 2002 may include user output components 2026 and user input components 2028. The user output components 2026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2002 may include biometric components 2030, motion components 2032, environmental components 2034, or position components 2036, among a wide array of other components. For example, the biometric components 2030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2032 include acceleration sensor components (e.g., accelerometer), gravitation sensor components, rotation sensor components (e.g., gyroscope).

The environmental components 2034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 2036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2002 further include communication components 2038 operable to couple the machine 2000 to a network 2022 or devices 2024 via respective coupling or connections. For example, the communication components 2038 may include a network interface Component or another suitable device to interface with the network 2022. In further examples, the communication components 2038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2024 may be another machine or any of a wide variety of peripheral devices (e.g., a peripheral device coupled via a USB).

Moreover, the communication components 2038 may detect identifiers or include components operable to detect identifiers. For example, the communication components 2038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2038, such as location via Internet Protocol (IP) geolocation, location via Wi-Fi® signal triangulation, location via detecting an NFC beacon signal that may indicate a particular location, and so forth.

The various memories (e.g., main memory 2014, static memory 2016, and memory of the processors 2004) and storage unit 2018 may store one or more sets of instructions and data structures (e.g., software) embodying or used by any one or more of the methodologies or functions described herein. These instructions (e.g., the instructions 2010), when executed by processors 2004, cause various operations to implement the disclosed examples.

The instructions 2010 may be transmitted or received over the network 2022, using a transmission medium, via a network interface device (e.g., a network interface component included in the communication components 2038) and using any one of several well-known transfer protocols (e.g., hypertext transfer protocol (HTTP)). Similarly, the instructions 2010 may be transmitted or received using a transmission medium via a coupling (e.g., a peer-to-peer coupling) to the devices 2024.

Software Architecture

Figure 21:
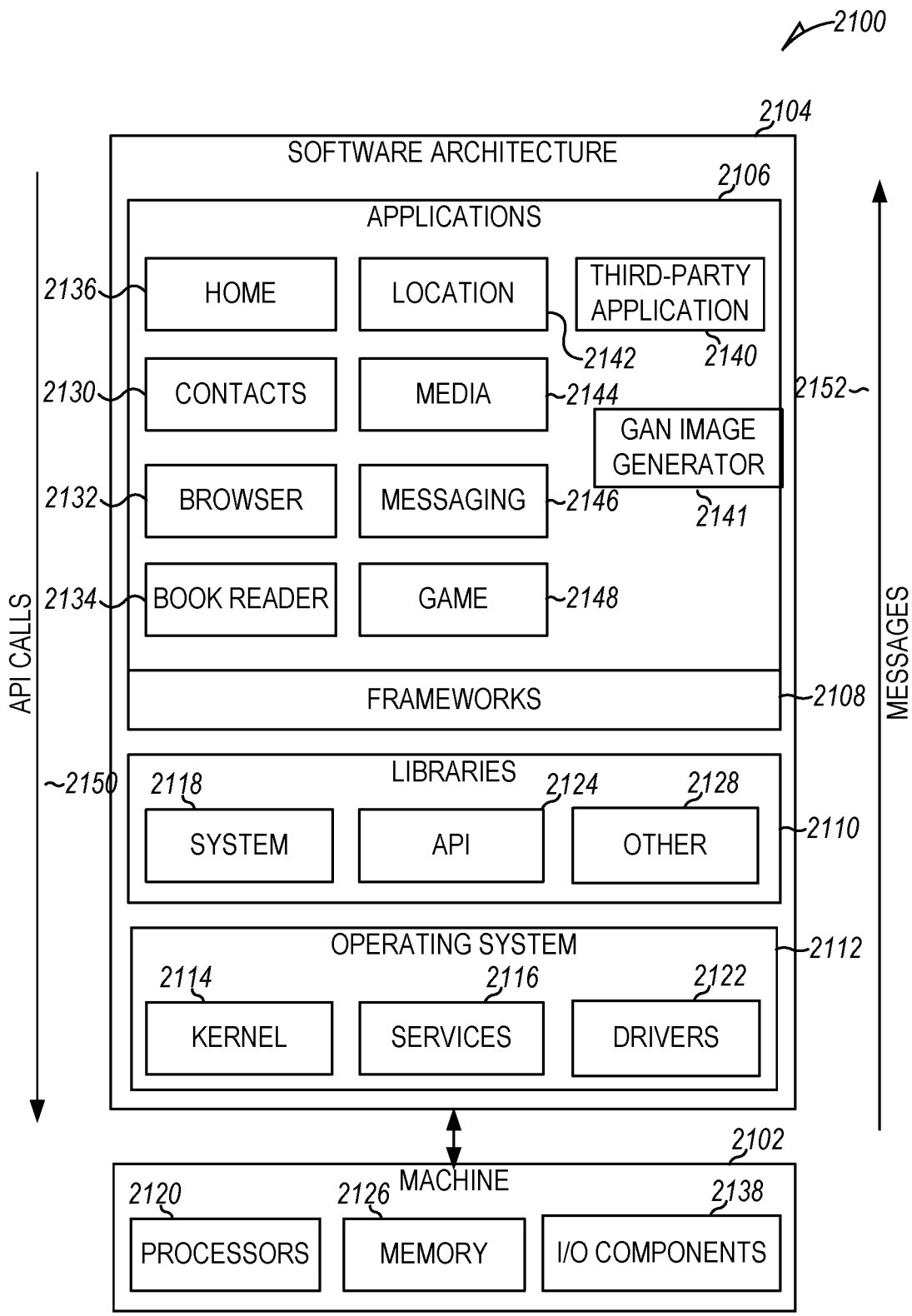
FIG. 21 is a block diagram showing a software architecture within which examples may be implemented.

FIG. 21 is a block diagram 2100 illustrating a software architecture 2104, which can be installed on any one or more of the devices described herein. The software architecture 2104 is supported by hardware such as a machine 2102 that includes processors 2120, memory 2126, and I/O components 2138. In this example, the software architecture 2104 can be conceptualized as a stack of layers, where each layer provides a particular functionality. The software architecture 2104 includes layers such as an operating system 2112, libraries 2110, frameworks 2108, and applications 2106. Operationally, the applications 2106 invoke API calls 2150 through the software stack and receive messages 2152 in response to the API calls 2150.

The operating system 2112 manages hardware resources and provides common services. The operating system 2112 includes, for example, a kernel 2114, services 2116, and drivers 2122. The kernel 2114 acts as an abstraction layer between the hardware and the other software layers. For example, the kernel 2114 provides memory management, processor management (e.g., scheduling), component management, networking, and security settings, among other functionality. The services 2116 can provide other common services for the other software layers. The drivers 2122 are responsible for controlling or interfacing with the underlying hardware. For instance, the drivers 2122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2110 provide a common low-level infrastructure used by the applications 2106. The libraries 2110 can include system libraries 2118 (e.g., C standard library) that provide functions such as memory allocation functions, string manipulation functions, mathematic functions, and the like. In addition, the libraries 2110 can include API libraries 2124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2110 can also include a wide variety of other libraries 2128 to provide many other APIs to the applications 2106.

The frameworks 2108 provide a common high-level infrastructure that is used by the applications 2106. For example, the frameworks 2108 provide various graphical user interface (GUI) functions, high-level resource management, and high-level location services. The frameworks 2108 can provide a broad spectrum of other APIs that can be used by the applications 2106, some of which may be specific to a particular operating system or platform.

In an example, the applications 2106 may include a home application 2136, a contacts application 2130, a browser application 2132, a book reader application 2134, a location application 2142, a media application 2144, a messaging application 2146, a game application 2148, and a broad assortment of other applications such as a third-party application 2140. The GAN image generator 2141 generates images such as the images described in conjunction with FIG. 18 and herein. The applications 2106 are programs that execute functions defined in the programs. Various programming languages can be employed to create one or more of the applications 2106, structured in a variety of manners, such as object-oriented programming languages (e.g., Objective-C, Java, or C++) or procedural programming languages (e.g., C or assembly language). In a specific example, the third-party application 2140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2140 can invoke the API calls 2150 provided by the operating system 2112 to facilitate functionality described herein.

Processing Components

Figure 22:
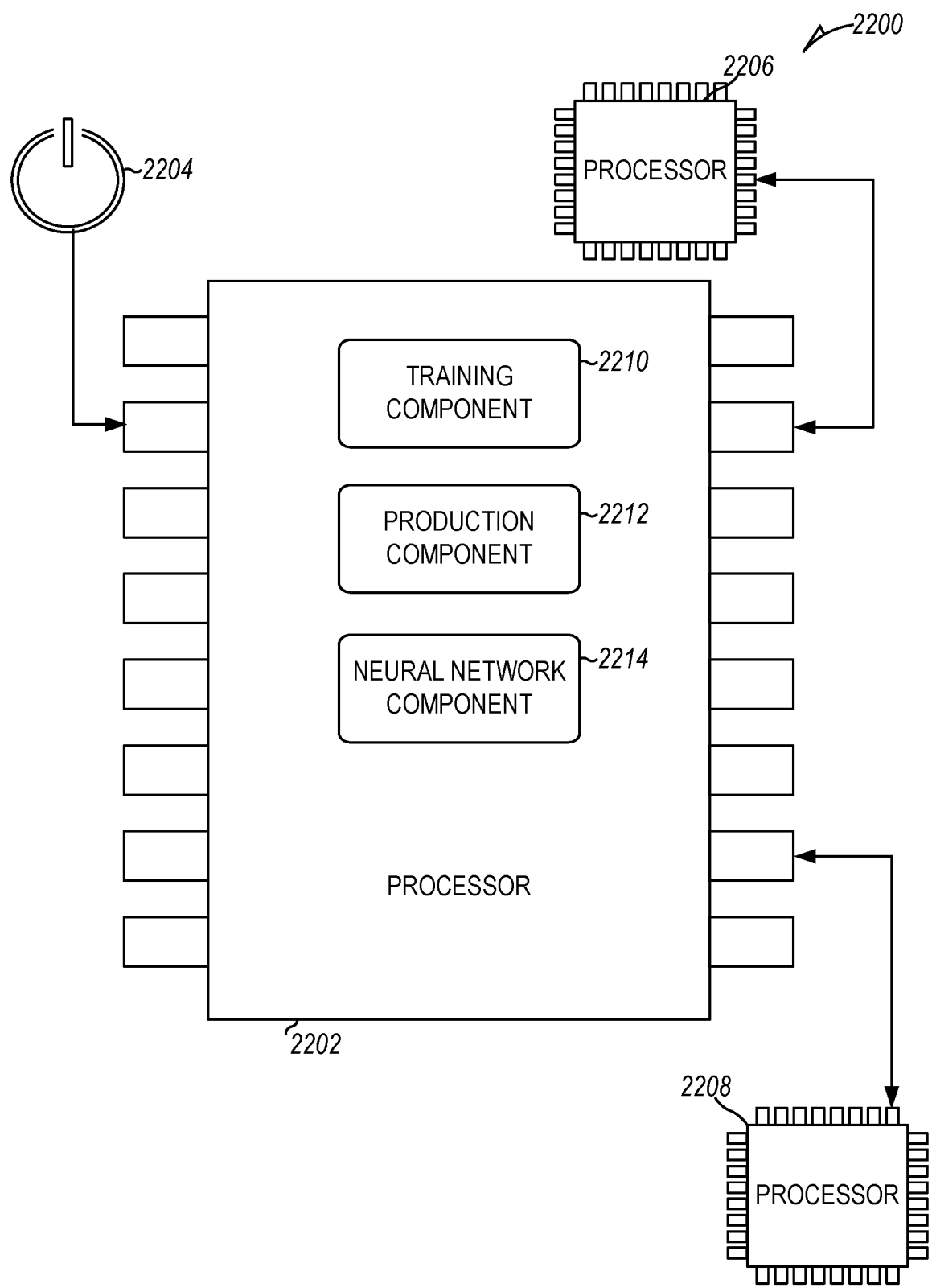
FIG. 22 is a diagrammatic representation of a processing environment, in accordance with some examples.

Turning now to FIG. 22 there is shown a diagrammatic representation of a processing environment 2200, which includes a processor 2202, a processor 2206, and a processor 2208 (e.g., a GPU, CPU or combination thereof).

The processor 2202 is shown to be coupled to a power source 2204, and to include (either permanently configured or temporarily instantiated) modules, namely a training component 2210, a production component 2212, and a neural network component 2214. The training component 2210 trains the neural networks such as G NN 602 or G NN 1700. The training component 2210 implements methods 700, 1100, and 1900. The production component 2212 implements the functions of an interface for a user to use the trained G NN 602 or G NN 1700. For example, the interface is illustrated in FIG. 12 on a screen of device 1226. The production component 2212 may be tied back to the messaging server system 108 to retrieve trained G NNs in accordance with the selected operations of the user.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
generating, using a pre-trained generative adversarial network (GAN), a plurality of images, the pre-trained GAN trained on a first plurality of target images;
determining a feature for each of the plurality of images;
determining the feature for each of a second plurality of target images;
matching, based on the feature, target images of the second plurality of target images with the plurality of images to generate a plurality of matched target images; and
training a discriminator of the pre-trained GAN with the plurality of matched target images and the plurality of images.

2. The method of claim 1 wherein the plurality of images is generated with a style code value as input to the pre-trained GAN, the style code value indicating a style of the second plurality of target images.

3. The method of claim 1 wherein the training is performed with weights of one or more layers of the pre-trained GAN frozen from being adjusted.

4. The method of claim 1 wherein the feature is an indication of at least one of gender, a head position, a head tilt, a facial expression, or a type of dress.

5. The method of claim 1 wherein a percentage difference between a first number of the plurality of matched target images and a second number of the plurality of images does not transgress a threshold percentage.

6. The method of claim 1 wherein the pre-trained GAN is trained with the plurality of matched target images and the plurality of images to generate a fine-tuned GAN.

7. The method of claim 6 further comprising:
generating a first output image using the pre-trained GAN with a latent space value as an input;
generating a second output image using the fine-tuned GAN with the latent space value as an input;
determine a warp field between the first output image and the second output image based on a face landmarks correspondence; and
project the warp field through a feature map of a layer of the fine-tuned GAN to generate a third output image.

8. The method of claim 7 further comprising:
blending the third output image with a background of the first image to generate a fourth image.

9. The method of claim 8 further comprising:
blending a skin tone of the first image with the fourth image to generate a fifth image.

10. The method of claim 9 wherein the blending the third output image with the background of the first image is performed in accordance with alpha blending and the blending the skin tone of the first image with the fourth image is performed in accordance with poison blending.

11. The method of claim 7 further comprising:
accessing an input image; and
inverse mapping the input image on the pre-trained GAN to determine the latent space value corresponding to the input image.

12. The method of claim 1 further comprising:
determining a symmetry value for each of the plurality of matched target images and the plurality of images; and
associating a condition value corresponding to the symmetry value for the plurality of matched target images and the plurality of images, wherein the training of the discriminator is performed with the condition value as an input.

13. The method of claim 1 wherein the discriminator is trained to output a probability value indicating a probability that an input image to the discriminator is an image from the plurality of matched target images or the plurality of images.

14. The method of claim 13 wherein the output is determined based on a dot product of a parameter value and a condition value input to a neural network associated with the discriminator and an output of a final layer of the discriminator.

15. The method of claim 14 wherein the neural network is a residual neural network that is trained with the discriminator.

16. The method of claim 1 wherein the training of the discriminator is performed based on batches of the plurality of matched target images and the plurality of images.

17. A system comprising:
at least one processor; and
a memory storing instructions that, when executed by the at least one processor, configure the system to perform operations comprising:
generating, using a pre-trained generative adversarial network (GAN), a plurality of images, the pre-trained GAN trained on a first plurality of target images;
determining a feature for each of the plurality of images;
determining the feature for each of a second plurality of target images;
matching, based on the feature, target images of the second plurality of target images with the plurality of images to generate a plurality of matched target images; and
training a discriminator of the pre-trained GAN with the plurality of matched target images and the plurality of images.

18. The system of claim 17, wherein the plurality of images are generated with a style code value as input to the pre-trained GAN, the style code value indicating a style of the second plurality of target images.

19. A non-transitory computer-readable storage medium, the non-transitory computer-readable storage medium including instructions that, when executed by a at least one processor, cause the at least one processor to perform operations comprising:
generating, using a pre-trained generative adversarial network (GAN) trained on a plurality of first target images, a plurality of images;
determining a feature for each of the plurality of images;
determining the feature for each of a plurality of second target images;
matching, based on the feature, second target images of the plurality of second target images with the plurality of images; and
training a discriminator of the pre-trained GAN with the second target images and the plurality of images.

20. The non-transitory computer-readable storage medium of claim 19, wherein the plurality of images are generated with a style code value as input to the pre-trained GAN, the style code value indicating a style of the second plurality of target images.

* * * * *